United States Patent
Wang et al.

(10) Patent No.: US 8,553,798 B2
(45) Date of Patent: Oct. 8, 2013

(54) METHOD AND APPARATUS FOR GENERATING PRE-CODING MATRIX CODEBOOK

(75) Inventors: Jian Wang, Beijing (CN); Jianming Wu, Beijing (CN); Yi Wang, Beijing (CN); Hua Zhou, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/411,160

(22) Filed: Mar. 2, 2012

(65) Prior Publication Data

US 2012/0163496 A1   Jun. 28, 2012

Related U.S. Application Data

(63) Continuation of application No. PCT/CN2009/074241, filed on Sep. 25, 2009.

(51) Int. Cl.
*H04B 7/02* (2006.01)
*H04L 1/02* (2006.01)

(52) U.S. Cl.
USPC ........... 375/267; 375/227; 375/260; 375/262; 375/265; 375/296; 375/285; 375/295; 375/316

(58) Field of Classification Search
USPC ......... 375/227, 260, 262, 267, 265, 296, 285, 375/295, 316
See application file for complete search history.

(56) References Cited

U.S. PATENT DOCUMENTS

| 2008/0080449 | A1 | 4/2008 | Huang et al. |
| 2008/0112500 | A1* | 5/2008 | Pan et al. ............... 375/267 |
| 2008/0165876 | A1 | 7/2008 | Suh et al. |
| 2008/0225962 | A1* | 9/2008 | Zhou et al. ............... 375/260 |
| 2008/0292013 | A1 | 11/2008 | Varadarajan et al. |

(Continued)

FOREIGN PATENT DOCUMENTS

| EP | 1919097 | 5/2008 |
| EP | 1919097 A1 * | 5/2008 |

(Continued)

OTHER PUBLICATIONS

Veljko Stankovic et al., "Generalized Design of Multi-User MIMO Precoding Matrices", Mar. 2008, IEEE, total of 9 pages.*

(Continued)

*Primary Examiner* — Sam K Ahn
*Assistant Examiner* — Fabricio R Murillo Garcia
(74) *Attorney, Agent, or Firm* — Myers Wolin, LLC

(57) ABSTRACT

This disclosure relates a method and apparatus for generating pre-coding matrix codebook. The method for generating pre-coding matrix codebook, comprising: acquiring a universal set of pre-coding matrixes in a first format; acquiring a universal set of pre-coding matrixes in a second format; selecting a first predetermined number of pre-coding matrixes in the first format from the universal set of pre-coding matrixes in the first format; and selecting a second predetermined number of pre-coding matrixes in the second format from the universal set of pre-coding matrixes in the second format, according to the selected first predetermined number of pre-coding matrixes in the first format.

8 Claims, 10 Drawing Sheets

(56) References Cited

U.S. PATENT DOCUMENTS

| | | |
|---|---|---|
| 2008/0303699 A1 | 12/2008 | Zhang et al. |
| 2008/0316910 A1 | 12/2008 | Ashikhmin |
| 2009/0006518 A1 | 1/2009 | Rensburg et al. |

FOREIGN PATENT DOCUMENTS

| | | |
|---|---|---|
| WO | 2008/086239 | 7/2008 |
| WO | WO 2008086239 A1 * | 7/2008 |
| WO | 2008/097035 | 8/2008 |
| WO | WO 2008097035 A1 * | 8/2008 |
| WO | 2008/137523 | 11/2008 |
| WO | WO 2008137523 A1 * | 11/2008 |

OTHER PUBLICATIONS

Second Office Action issued for corresponding Taiwan Patent Application No. 098132490, dated Jun. 24, 2013, with English translation.
Office Action issued for corresponding Japanese Patent Application No. 2012-530081, mailed Aug. 6, 2013, with English translation.
LG Electronics; "Consideration on rank 3 codebook design for UL SU-MIMO in LTE-A", Agenda Item: 15.5, Aug. 24-28, 2009, 3GPP TSG RAN WG1 Meeting #58, R1-093257, Shenzhen, China.

* cited by examiner

PERFORMANCE PARAMETER
MATRIX GENERATING SUB-UNIT
1020

PRE-CODING MATRIX CODEBOOK
GROUP APPARATUS 1300

PRE-CODING MATRIX CODEBOOK
GROUP APPARATUS 1400

METHOD AND APPARATUS FOR GENERATING PRE-CODING MATRIX CODEBOOK

CROSS REFERENCE TO RELATED APPLICATIONS

This is a continuation of Application PCT/CN2009/074241, filed on Sep. 25, 2009, now pending, the contents of which are herein wholly incorporated by reference.

FIELD OF THE INVENTION

The present invention generally relates to a radio communication system, and particularly, to a method and apparatus for generating pre-coding matrix codebook used in a multi-antenna communication system.

BACKGROUND OF THE INVENTION

Till now the radio communication system has been developed rapidly. The original second generation mobile communication system, i.e., the Global System for Mobile Communications (GSM) system is continuously evolved to techniques such as General Packet Radio Service (GPRS) and Enhanced Data Rate for GSM Evolution (EDGE), thereby greatly improving the data transmission capability of the system. The third generation mobile communication system has a higher transmission rate, adopts techniques such as Wideband Code Division Multiple Access (WCDMA) and CDMA 2000, and is successively deployed and put into commercial operation in many countries and regions all over the world. With the development of the cellular communication technique, some other radio access techniques such as Wireless Local Area Network (WLAN) and Worldwide Interoperability for Microwave Access (WiMAX) techniques are also developed quickly. In addition, projects such as the IEEE 802.16m technique for the fourth generation mobile communication system, the Third Generation Partnership Project Long Term Evolution (3GPP LTE) and the 3GPP LTE-Advanced are also started and being developed.

The Multiple Input Multiple Output (MIMO) multi-antenna system supports parallel transmissions of data streams, and greatly increases the system throughput, thus it garners particular attention in the academic researches and actual systems. Under normal circumstances, first of all, the forward error correction coding is independently performed for the parallel data streams in the multi-antenna transmission, and then the coded code words are mapped to one or more transmission layers. In case the code words are mapped to multiple transmission layers, a serial-to-parallel conversion of the serial data output from the coder is performed for multiple transmission layers. In one transmission, the number of transmission layers supported by the system is also referred to as the rank of the system.

Generally, the number of transmission layers supported by the multi-antenna system, i.e., the rank, is less than or equal to the number of the physical antennas of the multi-antenna system. The process of converting the data in each transmission layer into the data in each physical antenna is called as a signal pre-coding process. Particularly, the process of converting the data in each transmission layer into the data in each physical antenna through a linear operation is called as a signal linear pre-coding process. In the current radio communication system (e.g., the LTE system and the WiMax system), due to the limitations of the computational complexity and the signaling control complexity of the system, a certain number of pre-coding matrixes shall be designed for the system in advance. The set of the pre-coding matrixes is called as the pre-coding matrix codebook, in which the number of the pre-coding matrixes is called as the size of the pre-coding matrix codebook. In the multi-antenna system, the pre-coding matrix codebook, including the size and elements thereof, can directly influence the system indexes such as the throughput. Therefore, in order to improve the system performance (e.g., maximize the throughput), the pre-coding matrix codebook (including the size and pre-coding matrix elements thereof) used in the multi-antenna system shall be meticulously designed.

The pre-coding matrix codebook is composed of one or more pre-coding matrixes. Therefore, when the pre-coding matrix codebook and the pre-coding matrix codebook group is to be designed, the universal set of pre-coding matrixes shall be firstly acquired, so as to select therefrom the pre-coding matrixes for generating the pre-coding matrix codebook and the pre-coding matrix codebook group. There are various related arts to implement the universal set of pre-coding matrixes meeting the design conditions.

Each pre-coding matrix in the universal set of pre-coding matrixes may have the following form: $[1, 1, \ldots 1; x_{11}, x_{12}; \ldots; x_{1q}; x_{21}, x_{22}, \ldots, x_{2q}; \ldots; \ldots; \ldots; x_{p1}, x_{p2}, \ldots, x_{pq}]$, wherein p is an integer and $1 \leq p \leq P$, q is an integer and $1 \leq q \leq Q$, P is the number of the transmitting antennas of the communication system, and Q is the rank of the communication system. As mentioned above, in one transmission, the number of all transmission layers supported by the system is referred to as the rank of the system. The universal set of pre-coding matrixes in other forms may also be used to provide the pre-coding matrixes for generating the pre-coding matrix codebook and the pre-coding matrix codebook group.

For the convenience of description, the 4-antenna system is taken as an example to illustrate the composition of the universal set of pre-coding matrixes. In such a system, the number of the layers supported by the system may be 1 to 4, i.e., the rank is 1 to 4.

For example, when the rank is 1, the form of a pre-coding matrix p is $[1; x_{11}; x_{21}; x_{31}]$. The universal set of pre-coding matrixes for example may be formed by one or more of the following pre-coding matrixes meeting the above form.

4 pre-coding matrixes can be obtained from the Discrete Fourier Transform (DFT) matrix, wherein each of the pre-coding matrixes is corresponding to each column in the DFT matrix.

4 pre-coding matrixes can be obtained from the Hadamard matrix, wherein each of the pre-coding matrixes is corresponding to each column in the Hadamard matrix.

In addition, $x_{11}, x_{21}, x_{31}$ may be QPSK, 8PSK or 16PSK constellation points or constellation points of higher dimensions.

For example, when $x_{11}, x_{21}, x_{31}$ are QPSK constellation points, totally $4 \times 4 \times 4 = 64$ pre-coding matrixes meeting the above form are obtained.

For another example, when $x_{11}, x_{21}, x_{31}$ are 8PSK constellation points, totally $8 \times 8 \times 8 = 512$ pre-coding matrixes meeting the above form are obtained.

For still another example, when $x_{11}, x_{21}, x_{31}$ are 16PSK constellation points, totally $16 \times 16 \times 16 = 4096$ pre-coding matrixes meeting the above form are obtained.

Of course, there may be other form of pre-coding matrixes with the rank=1.

Upon the system request, the pre-coding matrixes of one, several or all of the above forms or the power normalized matrixes thereof may be taken as the universal set of pre-coding matrixes with the rank=1.

In another example, when the rank=2, the form of the pre-coding matrix p is [1 1; $x_{11}$ $x_{12}$; $x_{21}$ $x_{22}$; $x_{31}$ $x_{32}$]. Similarly, the universal set of pre-coding matrixes may be formed by one or more of the following pre-coding matrixes meeting the form. In addition, as an example p is a unitary matrix, i.e., $p^H \times p = \alpha I$, wherein $\alpha$ is a scalar.

6 pre-coding matrixes can be obtained from the DFT matrix, wherein each of the pre-coding matrixes is corresponding to two columns selected from the DFT matrix.

6 pre-coding matrixes can be obtained from the Hadamard matrix, wherein each of the pre-coding matrixes is corresponding to two columns selected from the Hadamard matrix.

In addition, $x_{11}$ $x_{12}$ $x_{21}$ $x_{22}$ $x_{31}$ $x_{32}$ may be QPSK, 8PSK or 16PSK constellation points or constellation points of higher dimensions.

For example, when $x_{11}$ $x_{12}$ $x_{21}$ $x_{22}$ $x_{31}$ $x_{32}$ are QPSK constellation points, totally 288 pre-coding matrixes meeting the above form are obtained.

For another example, when $x_{11}$ $x_{12}$ $x_{21}$ $x_{22}$ $x_{31}$ $x_{32}$ are 8PSK constellation points, totally 5376 pre-coding matrixes meeting the above form are obtained.

For still another example, when $x_{11}$ $x_{12}$ $x_{21}$ $x_{22}$ $x_{31}$ $x_{32}$ are 16PSK constellation points, totally 92160 pre-coding matrixes meeting the above form are obtained.

Of course, there may be other form of pre-coding matrixes with the rank=2.

Upon the system request, the pre-coding matrixes of one, several or all of the above forms or the power normalized matrixes thereof may be taken as the universal set of pre-coding matrixes with the rank=2.

The conditions of rank=3 and rank=4 are similar to the above conditions, and herein are not repeated.

In case of other antenna configurations, such as 2-antenna system, 8-antenna system or higher antenna system, the process of forming the universal set of pre-coding matrixes is similar to the process for the 4-antenna system, and herein is not repeated.

In different designs, there may be different forms of pre-coding matrixes for the same rank. For example, in case of the rank=3, there may be two different types of pre-coding matrixes, i.e., the Cubic Metric Preserving (CMP) pre-coding matrixes and the Cubic Metric Friendly (CMF) pre-coding matrixes.

When the CMP pre-coding matrixes are used, the CM value is lower, but the system performance is worse. On the other hand, when the CMF pre-coding matrixes are used, the CM value is higher, but the system performance is better. Thus for the actual system, corresponding pre-coding matrixes shall be extracted from the universal set of CMP pre-coding matrixes and the universal set of CMF pre-coding matrixes, respectively, to form the final codebook.

During the study of the present invention, the inventor finds that the following method that is easily conceivable usually cannot achieve the optimum codebook: forming a codebook by combining a predetermined number of best pre-coding matrixes extracted from the universal set of CMP pre-coding matrixes with a predetermined number of best pre-coding matrixes extracted from the universal set of CMF pre-coding matrixes. The inventor finds that this at least because the predetermined number of best pre-coding matrixes extracted from the universal set of CMP pre-coding matrixes and those extracted from the universal set of CMF pre-coding matrixes may be overlapped with each other or cannot optimally matched with each other, thus the formed codebook is not the optimum.

To be noted, although the above contents are arranged in the Background section so that a person skilled in the art can clearly understand the object of the present invention, it shall be appreciated that the above contents are not certainly well known to a person skilled in the art. It shall not be deemed that these contents are known by a person skilled in the art just because they are described in the Background section.

Literatures related to the related art and helpful to understand the present invention are listed as follows, and incorporated herein by reference, as if they were completely illustrated herein.

(1) European patent publication No. EP1919097A1 Codebook generator, codebook and method for generating update matrixes to be used in a precoding scheme with MIMO transmission
(2) US patent publication No. US2008080449A1 Generalized codebook design method for limited feedback systems
(3) US patent publication No. US2008165876A1 APPARATUS FOR GENERATING PRECODING CODEBOOK FOR MIMO SYSTEM AND METHOD USING THE APPARATUS
(4) US patent publication No. US2008292013A1 NESTED PRECODING CODEBOOK STRUCTURES FOR MIMO SYSTEMS
(5) US patent publication No. US2008303699A1 MIMO wireless precoding system robust to power imbalance
(6) US patent publication No. US2008316910A1 Complex vector quantization codebook for use in downlink multi-user MIMO mobile broadcast systems
(7) US patent publication No. US2009006518A1 Simple MIMO precoding codebook design for a MIMO wireless communications system
(8) International patent publication No. WO2008086239A1 PRECODING CODEBOOK FOR MIMO SYSTEMS
(9) International patent publication No. WO2008097035A1 CODEBOOK GENERATING METHOD AND APPARATUS FOR GENERATING A CODEBOOK FOR MULTI-POLARIZED MULTIPLE-INPUT MULTIPLE-OUTPUT (MIMO) SYSTEMS
(10) International patent publication No. WO2008137523A1 A CODEBOOK METHOD FOR MULTIPLE INPUT MULTIPLE OUTPUT WIRELESS SYSTEM

SUMMARY OF THE INVENTION

The embodiments of the present invention are proposed with respect to the above problems of the related art, so as to eliminate or relieve one or more problems of the prior art, and provide at least one beneficial choice.

In order to achieve the object of the present invention, the present invention provides the following aspects:

Aspect 1. A method for generating pre-coding matrix codebook, comprising:
acquiring a universal set of pre-coding matrixes in a first format;
acquiring a universal set of pre-coding matrixes in a second format;
selecting a first predetermined number of pre-coding matrixes in the first format from the universal set of pre-coding matrixes in the first format; and
selecting a second predetermined number of pre-coding matrixes in the second format from the universal set of pre-coding matrixes in the second format, according to the selected first predetermined number of pre-coding matrixes in the first format.

Aspect 2. The method for generating pre-coding matrix codebook according to aspect 1, wherein selecting the second predetermined number of pre-coding matrixes in the second format from the universal set of pre-coding matrixes in the second format comprises:

merging the selected first predetermined number of pre-coding matrixes in the first format with the universal set of pre-coding matrixes in the second format, so as to form a combined set of pre-coding matrixes;

forming a set of channel matrixes of a communication system to which the pre-coding matrixes are applied, and each of the channel matrixes is corresponding to one channel example;

forming a performance parameter matrix according to the combined set of pre-coding matrixes and the set of channel matrixes, each row of the performance parameter matrix represents performance parameter values related to the same pre-coding matrix, and each column represents performance parameter values related to the same channel matrix; and selecting the second predetermined number of pre-coding matrixes in the second format making a maximum contribution to the performance of the communication system, by using the performance parameter matrix and according to contributions to the performance of the communication system made by the respective pre-coding matrixes in the second format.

Aspect 3. The method for generating pre-coding matrix codebook according to aspect 2, wherein selecting the second predetermined number of pre-coding matrixes in the second format making a maximum contribution to the performance of the communication system is performed by stepwise decreasing rows in the performance parameter matrix corresponding to pre-coding matrixes in the second format making a minimum contribution to the performance of the communication system.

Aspect 4. The method for generating pre-coding matrix codebook according to aspect 2, wherein selecting the second predetermined number of pre-coding matrixes in the second format making a maximum contribution to the performance of the communication system is performed by stepwise increasing rows corresponding to pre-coding matrixes in the second format making the maximum contribution to the performance of the communication system, based on rows in the performance parameter matrix corresponding to the first predetermined number of pre-coding matrixes in the first format.

Aspect 5. The method for generating pre-coding matrix codebook according to aspect 3, wherein selecting the second predetermined number of pre-coding matrixes in the second format making a maximum contribution to the performance of the communication system is performed by:

1) deleting a row corresponding to the pre-coding matrixes in the second format from the performance parameter matrix of M rows and N columns, so as to obtain a performance parameter matrix of M−1 rows and N columns, where M is the number of rows in the current performance parameter matrix, M=K+M2, K is the number of pre-coding matrixes in the first format in the performance parameter matrix, M2 is the number of pre-coding matrixes in the second format in the performance parameter matrix, and N is the number of columns in the performance parameter matrix;

2) calculating performance parameters values of the performance parameter matrix of M−1 rows and N columns, 3) repeating processes 1) and 2) for M2 times, and each time deleting a row corresponding to a different pre-coding matrix in the second format from the performance parameter matrix, so as to obtain M2 performance parameters values, 4) taking a performance parameter matrix of M−1 rows and N columns, which is corresponding to a maximum one among the M2 performance parameters values, as a new performance parameter matrix, 5) judging whether the number of rows in the new performance parameter matrix is the sum of the first and second predetermined numbers, when the number of rows in the new performance parameter matrix is the sum of the first and second predetermined numbers, 6) outputting respective pre-coding matrixes corresponding to the new performance parameter matrix as pre-coding matrix codebook;

when the number of rows in the new performance parameter matrix is not the sum of the first and second predetermined numbers, setting the new performance parameter matrix as a current performance parameter matrix, and repeating the processing from 1).

Aspect 6. The method for generating pre-coding matrix codebook according to aspect 1, wherein the second predetermined number of pre-coding matrixes in the second format are selected from the universal set of pre-coding matrixes in the second format by:

setting the selected first predetermined number of pre-coding matrixes in the first format as a currently selected set of pre-coding matrixes, and setting the second universal set of pre-coding matrixes as a currently candidate set of pre-coding matrixes;

1) taking out one pre-coding matrix in the second format from the currently candidate set of pre-coding matrixes, as an added pre-coding matrix, 2) combining the taken out pre-coding matrix in the second format with the currently selected set of pre-coding matrixes, so as to form a combined set of pre-coding matrixes, 3) forming a performance parameter matrix according to the combined set of pre-coding matrixes and the set of channel matrixes, each row of the performance parameter matrix represents performance parameter values related to the same pre-coding matrix, and each column represents performance parameter values related to the same channel matrix, 4) calculating performance parameters values of the performance parameter matrix, 5) repeating processes 1) to 4) for M2 times, and each time taking out one different pre-coding matrix in the second format, so as to obtain M2 performance parameters values, where M2 is the number of pre-coding matrixes in the currently candidate set of pre-coding matrixes, 6) setting a combined set of pre-coding matrixes, which is corresponding to a performance parameter matrix that corresponds to a maximum one among the M2 performance parameters values, as a currently selected set of pre-coding matrixes, 7) judging whether the number of pre-coding matrixes in the currently selected set of pre-coding matrixes is the sum of the first and second predetermined numbers, when the number of pre-coding matrixes in the currently selected set of pre-coding matrixes is the sum of the first and second predetermined numbers, 8) outputting pre-coding matrixes in the currently selected set of pre-coding matrixes as pre-coding matrix codebook;

when the number of pre-coding matrixes in the currently selected set of pre-coding matrixes is not the sum of the first and second predetermined numbers, deleting an added pre-coding matrix corresponding to a maximum one of the M2 performance parameters values from the currently candidate set of pre-coding matrixes to obtain a new currently candidate set of pre-coding matrixes, and repeating the processing from 1) for the currently selected set of pre-coding matrixes and the new currently candidate set of pre-coding matrixes.

Aspect 7. The method for generating pre-coding matrix codebook according to aspect 4, wherein the second predetermined number of pre-coding matrixes in the second format making the maximum contribution are selected by:

selecting rows from the performance parameter matrix corresponding to the selected first predetermined number of pre-coding matrixes in the first format, as a selected performance parameter matrix, where assuming the number of selected rows is K; and selecting rows from the performance parameter matrix corresponding to the pre-coding matrixes in the second format, as an candidate performance parameter matrix, where assuming the number of selected rows is M2, 1) taking out a row from the candidate performance parameter matrix as a newly added row, 2) merging the newly added row with the selected performance parameter matrix, so as to form a matrix of K+1 rows and N columns;

3) calculating performance parameters values of the matrix of K+1 rows and N columns;

4) repeating steps 1) to 3) for M2 times, and each time taking out one row corresponding to a different pre-coding matrix in the second format from the candidate performance parameter matrix as a newly added row, so as to obtain M2 performance parameters values;

5) setting a matrix of K+1 rows and N columns corresponding to a maximum one of the M2 performance parameters values as a new selected performance parameter matrix, 6) judging whether the number of rows in the new selected performance parameter matrix is the sum of the first and second predetermined numbers, when the number of rows in the new selected performance parameter matrix is the sum of the first and second predetermined numbers, 7) outputting respective pre-coding matrixes corresponding to respective rows in the new selected performance parameter matrix as pre-coding matrix codebook;

when the number of rows is not the sum of the first and second predetermined numbers, deleting an added row corresponding to the maximum one of the M2 performance parameters values from the candidate performance parameter matrix, so as to form a new candidate performance parameter matrix, and repeating the processing from 1) for the new selected performance parameter matrix and the new performance parameter matrix.

Aspect 8. An apparatus for generating pre-coding matrix codebook, comprising:

a universal set of first pre-coding matrixes acquiring unit configured to acquire a universal set of pre-coding matrixes in a first format;

a universal set of second pre-coding matrixes acquiring unit configured to acquire a universal set of pre-coding matrixes in a second format;

a first pre-coding matrix selecting unit configured to select a first predetermined number of pre-coding matrixes in the first format from the universal set of pre-coding matrixes in the first format; and a second pre-coding matrix selecting unit configured to select a second predetermined number of pre-coding matrixes in the second format from the universal set of pre-coding matrixes in the second format, according to the selected first predetermined number of pre-coding matrixes in the first format.

Aspect 9. The apparatus for generating pre-coding matrix codebook according to aspect 8, wherein the second pre-coding matrix selecting unit comprising:

a combined set of pre-coding matrixes generating sub-unit configured to merge the selected first predetermined number of pre-coding matrixes in the first format with the universal set of pre-coding matrixes in the second format, so as to form a combined set of pre-coding matrixes;

a channel matrixes set acquiring sub-unit configured to form a set of channel matrixes of a communication system to which the pre-coding matrixes are applied, and each of the channel matrixes is corresponding to one channel example;

a performance parameter matrix generating sub-unit configured to form a performance parameter matrix according to the combined set of pre-coding matrixes and the set of channel matrixes, each row of the performance parameter matrix represents performance parameter values related to the same pre-coding matrix, and each column represents performance parameter values related to the same channel matrix; and a pre-coding matrixes in second format selecting sub-unit configured to select the second predetermined number of pre-coding matrixes in the second format making a maximum contribution to the performance of the communication system, by using the performance parameter matrix and according to contributions to the performance of the communication system made by the respective pre-coding matrixes in the second format.

Aspect 10. The apparatus for generating pre-coding matrix codebook according to aspect 9, wherein the pre-coding matrixes in second format selecting sub-unit selects the second predetermined number of pre-coding matrixes in the second format making the maximum contribution by stepwise decreasing rows in the performance parameter matrix corresponding to pre-coding matrixes in the second format making a minimum contribution to the performance of the communication system, or selects the second predetermined number of pre-coding matrixes in the second format making the maximum contribution by stepwise increasing rows corresponding to pre-coding matrixes in the second format making the maximum contribution to the performance of the communication system, based on rows in the performance parameter matrix corresponding to the first predetermined number of pre-coding matrixes in the first format.

Aspect 11: the apparatus for generating pre-coding matrix codebook according to aspect 9, further comprising a power normalizing unit configured to perform power normalization for the universal set of first pre-coding matrixes and the universal set of second pre-coding matrixes.

Aspect 12: the apparatus for generating pre-coding matrix codebook according to aspect 9, further comprising a power normalizing unit configured to perform power normalization for the combined set of pre-coding matrixes.

DETAILED DESCRIPTION OF THE EMBODIMENTS

The exemplary embodiments of the present invention will be described as follows in conjunction with the drawings. In order to be clear and concise, not all the features of the practice embodiments are described in the specification. However, it shall be appreciated that during the development of any of the embodiments, many specific decisions shall be made for the embodiment to achieve the developer's object. For example, the constraint conditions relevant to the system and service are satisfied, and these constraint conditions may vary with the embodiments. In addition, it shall be noted that although the development may be very complex and time consuming, the development is just a routine task for a person skilled in the art who benefits from the disclosure.

Herein to be noted, in order to avoid the present invention from being vague due to unnecessary details, the drawings only illustrate device structures and/or processing steps closely related to the solution according to the present invention, while omitting other details not so closely related.

For the convenience of description, the embodiments of the present invention are described by coordinating the CMF pre-coding matrixes (first pre-coding matrixes) with the CMP pre-coding matrixes (second pre-coding matrixes). It shall be appreciated that the embodiments of the present invention are not limited thereto, and the coordination of any two or more forms of pre-coding matrixes may also be feasible, e.g., a coordination of hadamard matrix vectors and DFT matrix vectors, a coordination of CMP pre-coding matrixes and CMF pre-coding matrixes, and a coordination of any two of the four forms.

Figure 1:
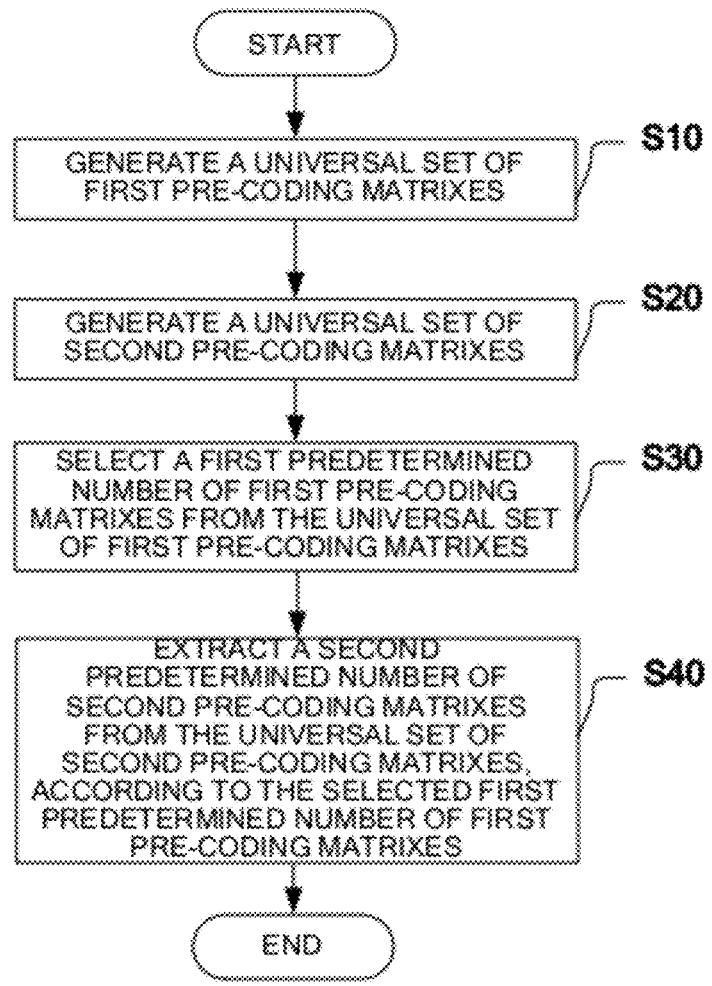
FIG. 1 schematically illustrates a method for generating a pre-coding matrix codebook according to an embodiment of the present invention.

FIG. 1 schematically illustrates a method for generating a pre-coding matrix codebook according to an embodiment of the present invention. As illustrated in FIG. 1, according to the method for generating a pre-coding matrix codebook according to an embodiment of the present invention, a universal set of first pre-coding matrixes is firstly generated in step S10. The universal set of first pre-coding matrixes may be generated by using the method described in the Background section of the present application, the method in the prior art known to a person skilled in the art, or the method to be conceived by a person skilled in the art. Herein the CMF pre-coding matrix is taken as an example of the first pre-coding matrix, thus in case of four antennas, a universal set of first pre-coding matrixes which includes 192 CMF pre-coding matrixes is generated in step S10. For the convenience of description, it is assumed that the universal set of first pre-coding matrixes includes M1 pre-coding matrixes, wherein M1 is a positive integer.

Next, a universal set of second pre-coding matrixes is generated in step S20. The universal set of second pre-coding matrixes may be generated by using the method described in the Background section of the present application, the method in the prior art known to a person skilled in the art, or the method to be conceived by a person skilled in the art. Herein the CMP pre-coding matrix is taken as an example of the second pre-coding matrix, thus in case of four antennas, a universal set of second pre-coding matrixes which includes 24 CMP pre-coding matrixes is generated in step S20. For the convenience of description, it is assumed that the universal set of second pre-coding matrixes includes M2 pre-coding matrixes, wherein M2 is a positive integer.

In step S30, a first predetermined number of first pre-coding matrixes are selected from the universal set of first pre-coding matrixes. The first predetermined number for example is 10. There are many methods for selecting the first predetermined number of first pre-coding matrixes from the universal set of first pre-coding matrixes, and various methods known in the prior art may be adopted. For the convenience of description, the first predetermined number is assumed as K, wherein K is a positive integer.

There are many methods for selecting a predetermined number of pre-coding matrixes from a universal set of pre-coding matrixes, such as a random selection, or an evolution after random selection. For example it may refer to a Chinese patent application titled as "method and apparatus for generating pre-coding matrix codebook" and filed on Sep. 18, 2009 with an agency volume No. FAI09JP1932E. The patent application is incorporated herein by reference, as if it was completely illustrated in this specification.

Next in step S40, a second predetermined number of second pre-coding matrixes are selected from the universal set of second pre-coding matrixes according to the selected first predetermined number of first pre-coding matrixes, and a pre-coding matrix codebook is formed by the first predetermined number of first pre-coding matrixes and the second predetermined number of second pre-coding matrixes. For the convenience of description, the second predetermined number is assumed as P, wherein P is a positive integer.

In step S40, according to an embodiment, the selected first predetermined number of first pre-coding matrixes are combined with the universal set of second pre-coding matrixes to form a combined set of pre-coding matrixes. In case 10 first pre-coding matrixes are selected from the universal set of first pre-coding matrixes and the second pre-coding matrixes are CMP pre-coding matrixes, the combined set of pre-coding matrixes for example includes 34 pre-coding matrixes. Next, a predetermined number of pre-coding matrixes including the first predetermined number of first pre-coding matrixes are selected from the combined set of pre-coding matrixes. For example, 16 pre-coding matrixes are selected to form a codebook, so as to achieve the coordination of the first and second pre-coding matrixes.

In step S40, according to another embodiment, a second predetermined number (e.g. 6) of second pre-coding matrixes are selected from the universal set of second pre-coding matrixes by combining stepwise with the selected first predetermined number of first pre-coding matrixes.

Herein the CMF pre-coding matrixes are taken as the example of the first pre-coding matrixes, and the CMP pre-coding matrixes are taken as the example of the second pre-coding matrixes. But these are just exemplary, instead of limitations to the embodiments of the present invention. For example, the CMP pre-coding matrixes may be taken as the example of the first pre-coding matrixes, and the CMF pre-coding matrixes may be taken as the example of the second pre-coding matrixes. The values of the first and second predetermined numbers may be determined based on experience, or selected in a descending or ascending order of the available values. The above numbers 6, 16 and 10 are just exemplary.

In addition, although the above steps are orderly described, it shall be appreciated that the orders of the above steps may be adjusted and some steps may be performed in parallel. For example, steps S10 and S20 may be performed in parallel, or step S30 may be performed before step S20.

As mentioned above, there are many methods for selecting the first predetermined number of first pre-coding matrixes from the universal set of first pre-coding matrixes in step S30, and selecting the second predetermined number of second pre-coding matrixes from the universal set of second pre-coding matrixes, and various methods known in the prior art may be adopted. The preferred methods for implementing steps S30 and S40 are introduced as follows.

Figure 2:
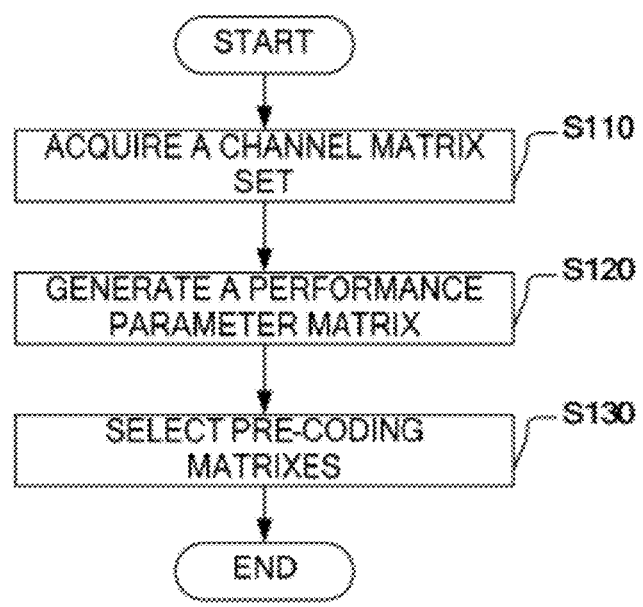
FIG. 2 illustrates a method for selecting a first predetermined number of pre-coding matrixes from a first universal set of pre-coding matrixes according to an embodiment of the present invention.

FIG. 2 illustrates a method for selecting a first predetermined number of pre-coding matrixes from a first universal set of pre-coding matrixes according to an embodiment of the present invention.

As illustrated in FIG. 2, according to the embodiment of the present invention, a channel matrix set of the communication system to which the codebook will be applied is generated at first; next, a performance parameter matrix is generated based on the channel matrix set and the universal set of pre-coding matrixes; next, a predetermined number of pre-coding matrixes are selected from the universal set of pre-coding matrixes based on the performance parameter matrix.

Firstly in step S110, a channel matrix set H=[$H_1$, $H_2$, $H_3$, . . . , $H_N$] is generated or read (e.g., from a memory), wherein N is an integer larger than 1. Each channel matrix $H_n$ (1≤n≤N) is corresponding to one channel instance. Due to the randomicity of the channel, the number N of the elements of the generated channel matrix set H shall be large enough to reflect the statistical characteristics of the channel.

A person skilled in the art shall be appreciated that the channel matrix set may be generated in various methods, and herein is omitted. Several conventional channel matrix forms are described as follows by taking the 4-transmitting antenna 4-receiving antenna system as an example.

For example, with respect to an independent Rayleigh fading channel, the channel example each time generated is a 4×4 matrix, and the elements thereof are signals irrelevant to each other and being in a complex Gaussian distribution. Herein the independent Rayleigh fading channel is just exemplary, and channels with other statistical characteristics may also be used.

For another example, in consideration of the correlations between the transmitting and receiving antennas and assuming that the correlation matrix is R, the channel instance each time generated may be $H_n$=unvec($R^{1/2}$×vec(H)), wherein H is the instance of the randomly generated Rayleigh fading channel, vec(H) means that the column vectors of the matrix H are orderly arranged as one-dimensional column vectors, and the unvec operation is the inverse operation of the vec operation.

Of course, there may be channel matrixes of other forms or statistical characteristics and corresponding method for generating the same, and herein are omitted.

In step S120, a performance parameter matrix TP is generated. In this step, for example an existed or formed universal set P of pre-coding matrixes, which is composed of M1 pre-coding matrixes (in case of the above pre-coding matrixes in the first format, M1 is 192), shall be used, and each element in the universal set P is assumed as $P_m$, wherein M1 and m are positive integers, 1≤m≤M1. In this step, for example a generated channel matrix set H composed of N channel matrixes shall also be used. Thus in step S120, a performance parameter matrix TP of M1 rows and N columns is generated based on the universal set of pre-coding matrixes and the channel matrix set. In the performance parameter matrix TP, each row represents the values of performance parameters (e.g., throughput) correlated to a same pre-coding matrix, each column represents the values of performance parameters correlated to a same channel matrix, and each element represents the value of the system throughput when a pre-coding matrix correlated to the row where the element locates is used under a channel instance corresponding to the channel matrix correlated to the column where the element locates.

Figure 3:
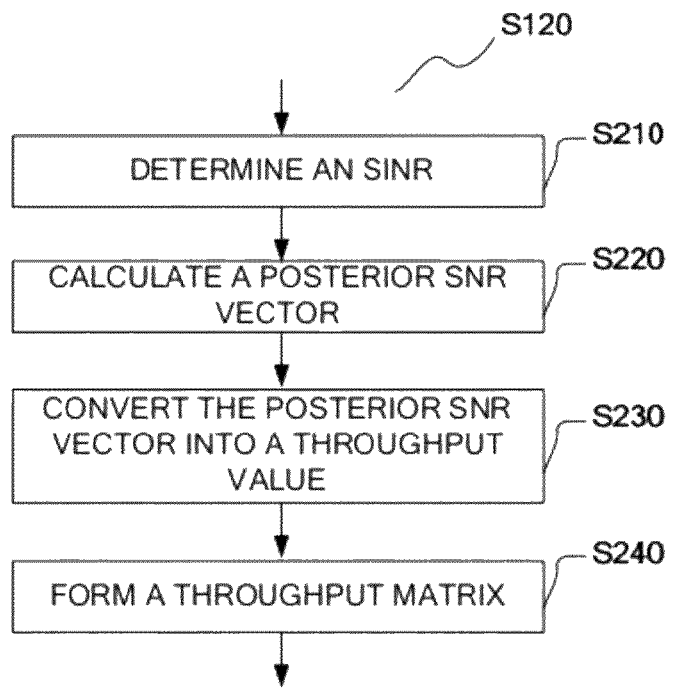
FIG. 3 illustrates a flowchart of step for generating a performance parameter matrix according to an embodiment of the present invention.

FIG. 3 illustrates a flowchart of steps for generating a performance parameter matrix according to an embodiment of the present invention. For the convenience of description, the system throughput is taken as an example of the performance parameter in this embodiment. A person skilled in the art shall be appreciated that other appropriate performance parameter such as system mutual information may be used as necessary.

As illustrated in FIG. 3, in the method for generating a performance parameter matrix according to the embodiment, firstly it is determined in step S210 that the Signal to Noise Ratio (SNR) of the operation of the systematic which applies the codebook determined in the embodiment of the present invention. The Signal to Interference and Noise Ratio (SINR) may also be determined in a similar method, and herein only the situation of determining the SNR is described. The SNR of the operation of a system may be a point such as 0 dB, 5 dB or 10 dB. Of course, there may be other SNR of the operation of the system and other statistical distribution characteristics, and herein are omitted.

Next, posterior SNR are calculated in step S220. The posterior SNR vector corresponding to each pre-coding matrix in the universal set P of pre-coding matrixes is calculated, based on the SNR, for the channel instance corresponding to each channel matrix in the channel matrix set H, so as to obtain M1×N posterior SNR vectors. A person skilled in the art may calculate the posterior SNR vector with various existed methods.

Several methods for calculating posterior SNR vector are given as follows as examples.

Assuming that the normalized noise power is $\sigma^2$, with respect to the pre-coding matrix $P_m$ ($1 \leq m \leq M1$), when the MMSE algorithm is used, the posterior SNR vector of the $H_n$ is $$SNR_{post,n,m} = 1 \cdot \text{diag}(\sigma^2 \cdot [\sigma^2 \cdot I + (H_n P_m)^H (H_n P_m)])^{-1} \quad \text{(Equation 1)}$$

when the ZF algorithm is used, the posterior SNR vector of the $H_n$ is $$SNR_{post,n,m} = 1 \cdot \text{diag}(\sigma^2 \cdot [(H_n P_m)^H (H_n P_m)])^{-1} \quad \text{(Equation 2)}$$

In the above algorithms, $SNR_{post,n,m}$ is the column vector, and its number of dimensions is the same as the number of columns of the pre-coding matrix $P_m$.

Of course, there are other decoding methods, such as the maximum likelihood decoding. Any decoding method is corresponding to a decoded posterior SNR vector, and herein is omitted.

In step S230, the posterior SNR vector is converted to throughput value. Different system throughput values may be calculated according to different definitions or different algorithms of the prior art.

For example, the system throughput represented by the Shannon limit can be obtained in the Shannon equation:

$$C = \log_2(1 + SNR) \quad \text{(Equation 3)}$$

For another example, when the system uses the QAM modulation and the maximum likelihood decoding, the mutual information corresponding to the modulation scheme can be obtained through numeric calculation or table lookup, and the system throughput value is represented with the mutual information.

For still another example, when the system uses the QAM modulation and the Max-Log-MAP decoding, the mutual information corresponding to the modulation scheme can be obtained through numeric calculation or table lookup, and the system throughput value is represented with the mutual information.

For still another example, in case the link level block error rate of each Modulation and Coding Scheme (MCS) of the system is known, the link level block error rate of each MCS of the system may be converted to the link level throughput rate of each MCS of the system, so as to obtain the system throughput value through table lookup.

Of course there are other mapping or calculation methods for mapping or calculating the posterior SNR vector into the system throughput value, and herein are omitted.

For the convenience of subsequent usage, all the throughput values are arranged into a throughput matrix TP of M1 rows and N columns in step S240, wherein each row represents the throughput values correlated to a same pre-coding matrix, each column represents the throughput values correlated to a same channel matrix, and each element represents the system throughput value when a pre-coding matrix correlated to the row where the element locates is used under a channel instance corresponding to the channel matrix correlated to the column where the element locates. Of course, the posterior SNR vectors calculated in step S220 may be arranged into such a matrix in step S220, then the matrix may be directly achieved by calculating the system throughput values in step S230, and the arranging process in step S240 is not required.

The steps for generating the performance parameter matrix according to the embodiment of the present invention are described as above with reference to FIG. 3. Now return to FIG. 2, in step S130, based on the performance parameter matrix TP, a predetermined number of pre-coding matrixes are selected from the universal set of pre-coding matrixes according to the contribution made by each of the pre-coding matrixes to the system performance parameter. Herein the higher the contribution to the system performance parameter is, the better the system performance is, and vice versa. For example, when the performance parameter is throughput, the higher the contribution to the throughput is, the larger the system throughput is, and vice versa.

In the embodiments of the present invention, the pre-coding matrixes are selected so that the contributions to the system performance parameter made by respective selected pre-coding matrixes among those made by the pre-coding matrixes from the universal set of pre-coding matrixes are the highest. For example, when K pre-coding matrixes are selected, they shall be the first K pre-coding matrixes among the universal set of pre-coding matrixes whose contributions to the system performance parameter are the $1^{st}$ to $K^{th}$ highest, wherein K is an integer and $1 \leq K \leq M1$.

How to select the pre-coding matrixes according to the performance parameter in step S130 is described as follows.

Assuming that there existed or formed a universal set of pre-coding matrixes composed of M1 elements $P_m$, wherein M1 and m are positive integers and $1 \leq K \leq M1$. Assuming that a performance parameter matrix TP of M1 rows and N columns has been generated, wherein each row represents the values of performance parameters correlated to a same pre-coding matrix, and each column represents the values of performance parameters correlated to a same channel matrix.

There are two manners for selecting the pre-coding matrixes according to the performance parameter matrix, one is matrix deletion and the other is matrix addition, which are introduced as follows respectively.

Matrix Deletion

According to an embodiment of the present invention, K pre-coding matrixes are selected from the universal set of pre-coding matrixes by deleting pre-coding matrixes making small contributions, based on the contribution made by each pre-coding matrix to the system performance parameter.

In case of matrix deletion, a first level pre-coding matrixes sorting sub-processing is performed for the performance parameter matrix TP, so as to determine a pre-coding matrix making the first minimum contribution to the performance parameter of the communication system, and then the pre-coding matrix is deleted. Next, a second level pre-coding matrixes sorting sub-processing is performed for the performance parameter matrix TP having the pre-coding matrix making the first minimum contribution to the performance parameter of the communication system deleted, so as to determine a pre-coding matrix making a second minimum contribution to the performance parameter of the communication system, and then the pre-coding matrix is deleted. In this way, the pre-coding matrixes making the contributions to the performance parameter of the communication system from the first minimum to the $(M1-K)^{th}$ minimum are determined and deleted, and the rest K pre-coding matrixes are the selected pre-coding matrixes.

For a performance parameter matrix A of L rows and N columns, assuming that each column of matrix A has the maximum value $a_l$, i.e., $a_l = \max(A(:, l))$, $1 \leq l \leq L$, and the N maximum values are added, i.e., $tp(A) = \text{sum}(a_l)$. In this specification, the above operation is defined as an operation of calculating the performance parameter value of matrix A.

When a first predetermined number (e.g., K) of pre-coding matrixes are selected from a universal set of first pre-coding matrixes, for example the following steps may be adopted. By using the performance parameter matrix TP as a first level performance parameter matrix $TP_1$, and the first level pre-coding matrixes sorting sub-processing includes the following steps:

(1) deleting the $i^{th}$ line of the first level performance parameter matrix $TP_1$ to obtain a performance parameter matrix $TP_1$, of M1−1 rows and N columns, wherein i is an integer and 1≤i≤M;

(2) adding the maximum values of the respective columns of the performance parameter matrix $TP_{1i}$, i.e., performing an operation of calculating the performance parameter value of the performance parameter matrix $TP_{1i}$, and the obtained value is the performance parameter value of the performance parameter matrix $TP_{1i}$;

(3) repeating steps (1) and (2) for M1 times, and each time deleting a different line (the value of i is changed) from the performance parameter matrix $TP_1$, thereby obtaining the performance parameter values of M1 performance parameter matrixes $TP_{11}$;

(4) assuming that the deletion line corresponding to the maximum one of the M1 performance parameter values is the $x^{th}$ line in the first level performance parameter matrix $TP_1$ and 1≤x≤M1, determining that a pre-coding matrix correlated to the $x^{th}$ line in the universal set of pre-coding matrixes is the pre-coding matrix making a first minimum contribution to the system performance parameter;

(5) deleting the $x^{th}$ line from the first level performance parameter matrix $TP_1$ to obtain a performance parameter matrix of M1−1 rows and N columns as a second level performance parameter matrix $TP_2$.

A second level pre-coding matrixes sorting sub-processing similar to the first level pre-coding matrixes sorting sub-processing is performed for the second level performance parameter matrix $TP_2$, so as to determine the pre-coding matrix making a second minimum contribution to the system performance parameter, and obtain a performance parameter matrix of M1−2 rows and N columns as a third level performance parameter matrix $TP_3$. The steps of the second level pre-coding matrixes sorting sub-processing are substantially the same as those of the first level pre-coding matrixes sorting sub-processing, and only the calculation times and the number of matrix rows are slightly changed since the second level performance parameter matrix $TP_2$ lacks one row as compared with the first level performance parameter matrix $TP_i$.

Similarly, the third to M1−$K^{th}$ levels of pre-coding matrix sorting sub-processing are performed to determine the pre-coding matrixes making the third to M1−$K^{th}$ minimum contributions to the system performance parameter, respectively. The K pre-coding matrixes obtained by deleting the M1−K pre-coding matrixes making the first to M1−$K^{th}$ minimum contributions to the performance parameter of the communication system are taken as selected pre-coding matrixes.

Matrix Addition

According to an embodiment of the present invention, when a first predetermined number of pre-coding matrixes are selected from the universal set of first pre-coding matrixes, K pre-coding matrixes making the maximum contributions may be selected from the universal set of pre-coding matrixes by stepwise selecting pre-coding matrixes making large contributions, based on the contribution to the system performance parameter made by each pre-coding matrix.

In the manner of matrix addition, firstly a first level pre-coding matrixes sorting sub-processing is performed for the performance parameter matrix TP, so as to determine a pre-coding matrix making the first maximum contribution to the performance parameter of the communication system, and then the pre-coding matrix is selected. Next, a second level pre-coding matrixes sorting sub-processing is performed for the performance parameter matrix TP having the pre-coding matrix making the first maximum contribution to the performance parameter of the communication system deleted, so as to determine a pre-coding matrix making a second maximum contribution to the performance parameter of the communication system, and then the pre-coding matrix is selected. In this way, the pre-coding matrixes making the contributions to the performance parameter of the communication system from the first to $K^{th}$ maximum are determined and selected.

When a first predetermined number (e.g., K) of pre-coding matrixes are selected from a universal set of first pre-coding matrixes, for example the following steps may be adopted.

(1) taking the $i^{th}$ row of the first level performance parameter matrix $TP_1$ to obtain a performance parameter matrix $TP_1$, of 1 row and N columns, wherein i is an integer and 1≤i≤M1;

(2) adding the maximum values of the respective columns of the performance parameter matrix $TP_{1i}$, i.e., calculating the performance parameter value of the performance parameter matrix $TP_{1i}$, and the obtained value is taken as the performance parameter value of the performance parameter matrix $TP_{1i}$;

(3) repeating steps (1) and (2) for M1 times, and each time deleting a different row from the performance parameter matrix $TP_1$, thereby obtaining the performance parameter values of M1 performance parameter matrixes $TP_{1i}$;

(4) assuming that the selection row corresponding to the maximum one of the M1 performance parameter values is the $x^{th}$ row in the first level performance parameter matrix $TP_1$ (represented as performance parameter matrix $TP^1$) and 1≤x≤M1, determining that a pre-coding matrix correlated to the $x^{th}$ row in the universal set of pre-coding matrixes is the pre-coding matrix making a first maximum contribution to the system performance parameter; selecting the pre-coding matrix;

(5) deleting the $x^{th}$ row from the first level performance parameter matrix $TP_1$ to obtain a performance parameter matrix of M1−1 rows and N columns as a second level performance parameter matrix $TP_2$.

Next, a second level pre-coding matrixes sorting sub-processing is performed for the second level performance parameter matrix $TP_2$, including the steps of:

(1) taking the $i^{th}$ row of the second level performance parameter matrix $TP_2$ to be combined with one row (i.e., the performance parameter matrix $TP^1$) correlated to a pre-coding matrix making a first maximum contribution to the system performance parameter, so as to obtain a performance parameter matrix $TP_2$, of 2 rows and N columns, wherein i is an integer and M1−1;

(2) adding the maximum values of the respective columns of the performance parameter matrix $TP_{2i}$, i.e., calculating the performance parameter value of the performance parameter matrix $TP_{2i}$, and the obtained value is the performance parameter value of the performance parameter matrix $TP_{2i}$;

(3) repeating steps (1) and (2) for M1−1 times, and each time deleting a different row from the performance parameter matrix $TP_2$, thereby obtaining M1−1 performance parameter values of performance parameter matrixes $TP_{2i}$;

(4) assuming that the selection row corresponding to the maximum one of the M1−1 performance parameter values is the $x^{th}$ row in the second level performance parameter matrix $TP_2$ and 1≤x≤M1−1, determining that a pre-coding matrix correlated to the $x^{th}$ row in the universal set of pre-coding matrixes is the pre-coding matrix making a second maximum contribution to the system performance parameter;

(5) deleting the $x^{th}$ row from the second level performance parameter matrix $TP_2$ to obtain a performance parameter matrix of M1−2 rows and N columns as a third level performance parameter matrix $TP_3$; meanwhile, combining one row correlated to the pre-coding matrix making the first maximum contribution to the system performance parameter with one row correlated to the pre-coding matrix making the second maximum contribution to the system performance parameter, thereby forming a performance parameter matrix $TP^2$.

Similarly, the third to $K^{th}$ levels of pre-coding matrixes sorting sub-processing are performed to determine the pre-coding matrixes making the third to $(M1-K)^{th}$ maximum contributions to the system performance parameter, respectively.

In the $K^{th}$ (1≤k≤M1) level pre-coding matrixes sorting sub-processing, in step (1) combining the $i^{th}$ row of the $K^{th}$ level performance parameter matrix with K−1 rows deleted before the this sub-processing, thereby forming a performance parameter matrix $TP_K$, of K rows and N columns, wherein i is an integer and 1≤i≤M1+1−K. When K=1, no row of the performance parameter matrix TP is deleted since the sub-processing is of the first level, thus in step (1) combining the $i^{th}$ row of the first level performance parameter matrix TP1 with 0 row, thereby forming a performance parameter matrix of 1 row and N columns.

In this way, a predetermined number (K) of pre-coding matrixes are selected as the pre-coding matrix codebook from M1 pre-coding matrixes of the universal set of pre-coding matrixes according to contributions to the system performance parameter.

The preferred method for selecting a second predetermined number of second pre-coding matrixes from the universal set of second pre-coding matrixes, based on the selected first predetermined number of first pre-coding matrixes in step S40 will be described as follows.

Figure 4:
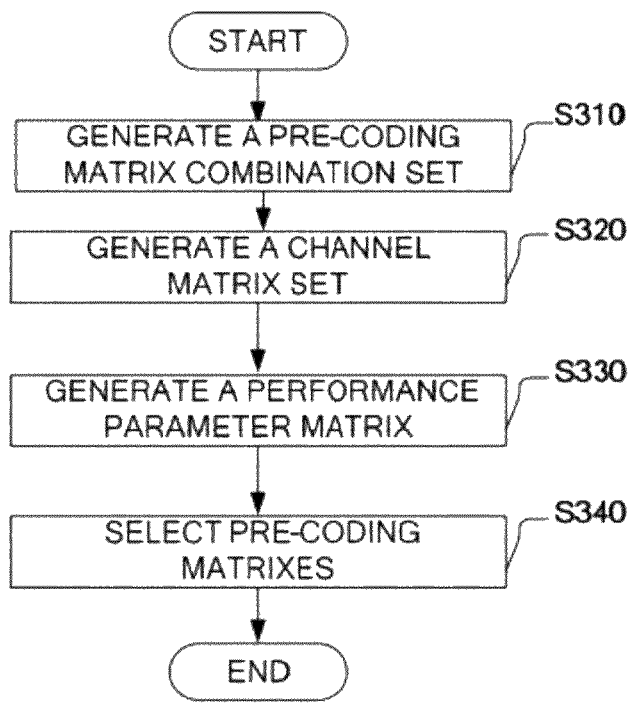
FIG. 4 schematically illustrates a preferred method for selecting a second predetermined number of second pre-coding matrixes from a universal set of second pre-coding matrixes based on the selected first predetermined number of first pre-coding matrixes according to an embodiment of the present invention.

FIG. 4 schematically illustrates a preferred method for selecting a second predetermined number of second pre-coding matrixes from the universal set of second pre-coding matrixes based on the selected first predetermined number of first pre-coding matrixes according to an embodiment of the present invention.

As illustrated in FIG. 4, according to an embodiment of the present invention, firstly a combined set of pre-coding matrixes is generated in step S310. Specifically, the selected first predetermined number of first pre-coding matrixes are combined with the universal set of second pre-coding matrixes to generate a combined set of pre-coding matrixes. For example, when 10 first pre-coding matrixes are selected from the universal set of first (CMF) pre-coding matrixes and the second pre-coding matrixes are CMP pre-coding matrixes, the combined set of pre-coding matrixes includes 34 pre-coding matrixes. For the convenience of description, it is assuming that there are M pre-coding matrixes in the combined set of pre-coding matrixes, wherein M is a positive integer, including K first pre-coding matrixes and M2 second pre-coding matrixes.

Next, a channel matrix set H=[$H_1$, $H_2$, $H_3$, . . . , $H_N$] is generated in step S320, wherein N is an integer larger than 1. Each channel matrix $H_n$(1≤n≤N) is corresponding to one channel instance. The method for generating the channel matrix set H=[$H_1$, $H_2$, $H_3$, $H_N$] may refer to the description of step S110.

In step S330, a performance parameter matrix TP of M rows and N columns is generated based on the combined set of pre-coding matrixes and the channel matrix set. In the performance parameter matrix TP, each row represents the values of performance parameters correlated to a same pre-coding matrix in the combined set of pre-coding matrixes, and each column represents the values of performance parameters correlated to a same channel matrix. The steps for generating the performance parameter matrix TP may refer to the above description.

Next in step S340, selecting the pre-coding matrixes in the second format based on the generated performance parameter matrix TP. Similarly, the two manners of matrix deletion and matrix addition may also be adopted in this step.

The manner of matrix deletion is described as follows.

In step S340, P pre-coding matrixes are selected from the pre-coding matrixes in the second format among the combined set of pre-coding matrixes by deleting pre-coding matrixes making small contributions, based on contributions to the system performance parameter made by the pre-coding matrixes in the second format of the combined set of pre-coding matrixes.

In the manner of matrix deletion, firstly a first level pre-coding matrixes sorting sub-processing is performed for the performance parameter matrix TP, so as to determine a pre-coding matrix in the second format making the first minimum contribution to the performance parameter of the communication system, and then the row corresponding to the pre-coding matrix is deleted. Next, a second level pre-coding matrixes sorting sub-processing is performed for the performance parameter matrix TP having the row corresponding to the pre-coding matrix in the second format making the first minimum contribution to the performance parameter of the communication system deleted, so as to determine a pre-coding matrix in the second format making a second minimum contribution to the performance parameter of the communication system, and then the row corresponding to the pre-coding matrix is deleted. In this way, the rows corresponding to the pre-coding matrixes making contributions to the performance parameter of the communication system from the first to $(M1-(K+P))^{th}$ minimum are determined and deleted, and then the pre-coding matrixes corresponding to the obtained performance parameter matrix including K+P rows are the selected pre-coding matrixes.

In order to describe the matrix deletion more clearly, the situation of selecting a second predetermined number (e.g., P) of pre-coding matrixes in second format from a combined set of pre-coding matrixes will be described in reference to FIG. 5.

Figure 5:
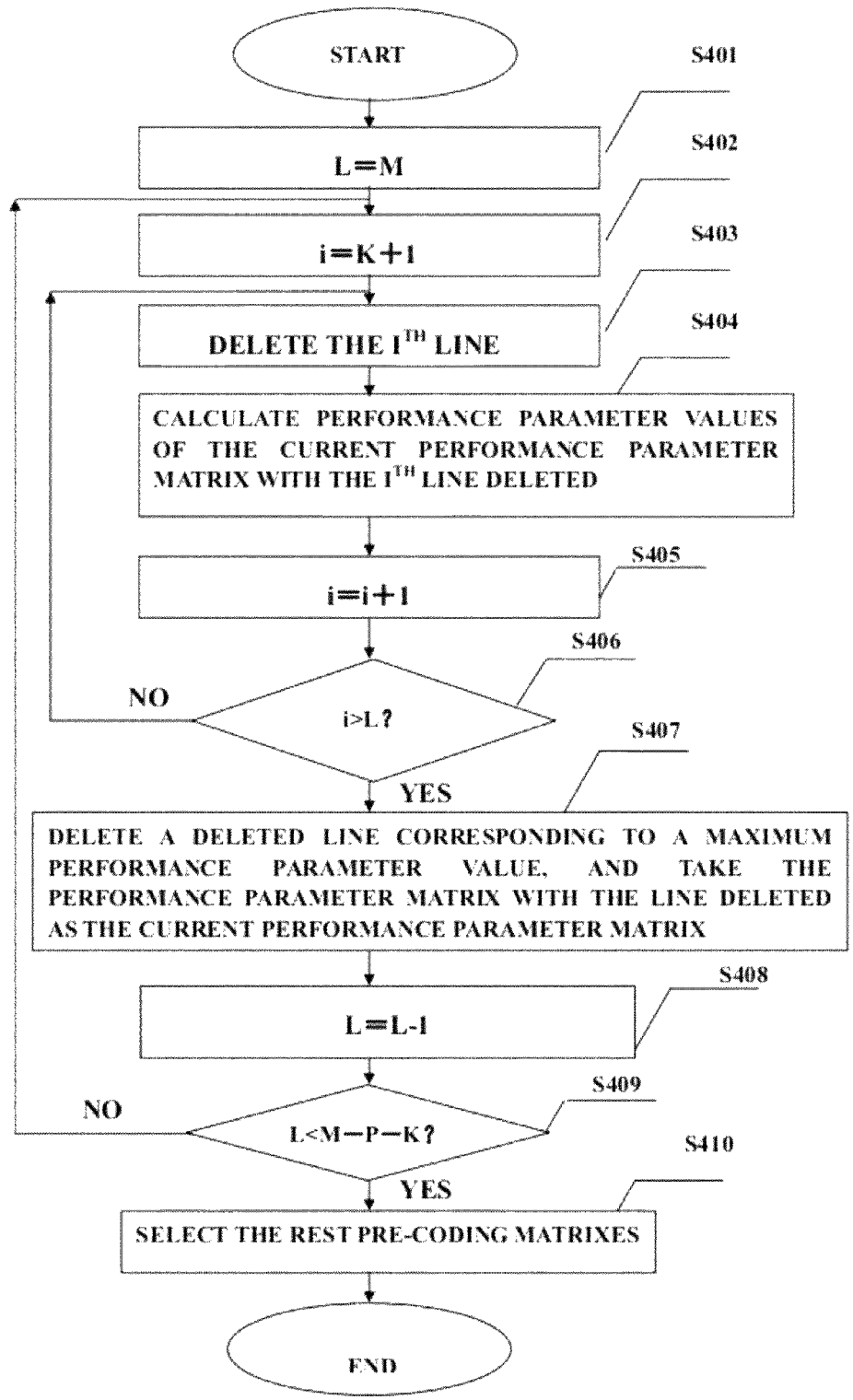
FIG. 5 illustrates a flowchart of selecting a second predetermined number of pre-coding matrixes in second format from a combined set of pre-coding matrixes in the manner of matrix subtraction according to an embodiment of the present invention.

FIG. 5 illustrates a flowchart of selecting a second predetermined number (e.g., P) of pre-coding matrixes in second format from a combined set of pre-coding matrixes in the manner of matrix subtraction according to an embodiment of the present invention.

As illustrated in FIG. 5, firstly in step S401, let L=M, wherein M is the number of rows in a performance parameter matrix TP, i.e., the total number of the pre-coding matrixes included in the combined set of pre-coding matrixes.

In step S402, let i=K+1, wherein K is the number of the pre-coding matrixes from the universal set of first pre-coding matrixes in the combined set of pre-coding matrixes. Assuming that in the performance parameter matrix TP, the K pre-coding matrixes are corresponding to the $1^{st}$ to $K^{th}$ rows, respectively.

The $i^{th}$ row of the current performance parameter matrix is deleted in step S403, and the performance parameter value of the current performance parameter matrix having the $i^{th}$ row deleted is calculated in step S404. The method for calculating performance parameter value has been described before.

Next, in step S405 the value of i is added by 1.

In step S406, it is judged whether i is larger than L, i.e., whether the rows in the performance parameter matrix corresponding to respective pre-coding matrixes in the universal set of second pre-coding matrixes have been deleted.

If no, the process returns to step S403.

If yes, the process goes to step S407.

In step S407, a deletion row corresponding to the minimum one of the calculated performance parameter values is deleted, and the performance parameter matrix having the row deleted is taken as the current performance parameter matrix.

It can be seen that the above steps actually construct a process of finding out and deleting the pre-coding matrix in second format currently making a minimum contribution to the system performance.

In step S408 the value of L is reduced by 1.

In step S409, it is judged whether L is less than M-P-K, i.e., whether enough pre-coding matrixes have been deleted.

If no, the process returns to step S402, and if yes, the process goes to step S410 to select the pre-coding matrix corresponding to respective rows of the current performance parameter matrix.

To be noted, when let i=1 in step S402, while it is judged in step S409 whether L is less than M-K, the flowchart as illustrated in FIG. 4 can be suitable to the situation of selecting K pre-coding matrixes from the universal set of first pre-coding matrixes.

The manner of matrix addition is introduced as follows.

In step S340, P pre-coding matrixes in second format making the maximum contributions may be selected from the universal set of pre-coding matrixes by stepwise selecting pre-coding matrixes making large contributions, based on the contributions to the system performance parameter made by the pre-coding matrixes in second format among the combined set of pre-coding matrixes.

In the manner of matrix addition, firstly a first level pre-coding matrixes sorting sub-processing is performed for the performance parameter matrix TP, so as to determine a pre-coding matrix in second format making the first maximum contribution to the performance parameter of the communication system, and then the pre-coding matrix is selected. Next, a second level pre-coding matrixes sorting sub-processing is performed for the performance parameter matrix TP having the row corresponding to the pre-coding matrix in second format making the first maximum contribution to the performance parameter of the communication system deleted, so as to determine a pre-coding matrix in second format making a second maximum contribution to the performance parameter of the communication system, and then the pre-coding matrix is selected. In this way, the pre-coding matrixes making the contributions to the performance parameter of the communication system from the first to $P^{th}$ maximum are determined and selected.

Figure 6:
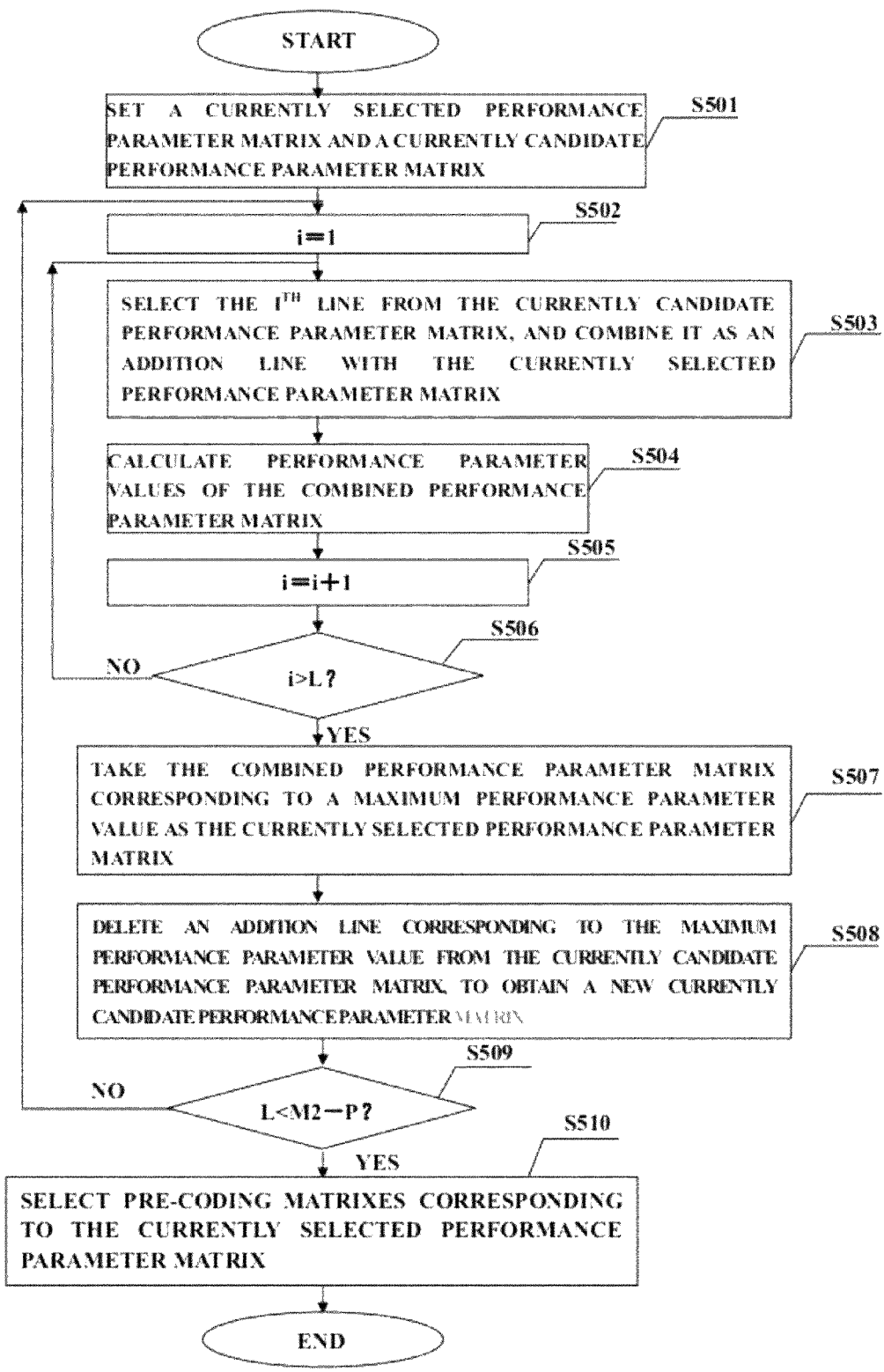
FIG. 6 illustrates a flowchart of selecting a second predetermined number of pre-coding matrixes in second format from a combination set of pre-coding matrixes in the manner of matrix addition according to an embodiment of the present invention.

FIG. 6 illustrates a flowchart of selecting a second predetermined number (e.g., P) of pre-coding matrixes in second format from a combined set of pre-coding matrixes in the manner of matrix addition according to an embodiment of the present invention.

As illustrated in FIG. 6, firstly in step S501, setting the rows in the performance parameter matrix TP corresponding to the selected K pre-coding matrixes in first format as the currently selected performance parameter matrix, and setting the rows in the performance parameter matrix TP corresponding to the pre-coding matrixes in second format as the currently candidate performance parameter matrix.

In step S502, let i=1.

In step S503, the $i^{th}$ row is selected as an addition row from the currently candidate performance parameter matrix to be combined with the currently selected performance parameter matrix.

In step S504, the performance parameter values of the performance parameter matrix obtained after the combination in step S503 are calculated.

In step S505, i is added by 1.

In step S506, it is judged whether i is larger than L, wherein L is the number of rows in the currently candidate performance parameter matrix.

If no, the process returns to step S503.

If yes, the process enters step S507. In step S507, the addition row corresponding to the maximum one of the L performance parameter values obtained in step S504 is added to the current performance parameter matrix (the obtained matrix is actually the performance parameter matrix obtained after a combination in step S503 corresponding to the maximum performance parameter value), and the matrix is set as a new currently selected performance parameter matrix.

The above process selects the pre-coding matrix currently making the maximum contribution to the system performance.

Next in step S508, the addition row corresponding to the maximum performance parameter value is deleted from the currently candidate performance parameter matrix, thereby obtaining a new currently candidate performance parameter matrix.

In step S509, it is judged whether enough pre-coding matrixes are obtained. For example, it may be judged whether L is less than M2−P, herein M2 is the number of the pre-coding matrixes in the universal set of pre-coding matrixes in second format, and P is the number of the pre-coding matrixes in second format to be selected therefrom. It may also be judged whether the number of the currently selected pre-coding matrixes is a sum of the first and second predetermined numbers.

When enough pre-coding matrixes are obtained (step S509, Yes), the process enters step S510, and outputs the pre-coding matrixes corresponding to the currently selected performance parameter matrix.

When enough pre-coding matrixes are still not obtained (step S509, No), the process enters step S502 and further selects a next pre-coding matrix making the maximum contribution to the system performance.

The above described embodiments are just exemplary, e.g., step S508 may be performed after S509 and before step S510.

Please refer to the previous description of step S130 to help understanding the description of step S340.

Figure 7:
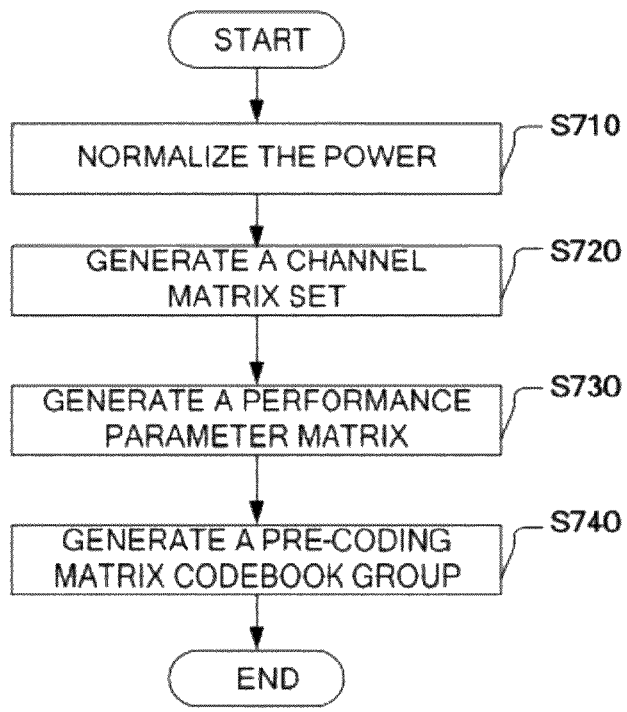
FIGS. 7-8 illustrate methods for selecting a first predetermined number of pre-coding matrixes from a universal set of first pre-coding matrixes according to another two embodiments of the present invention.
Figure 8:
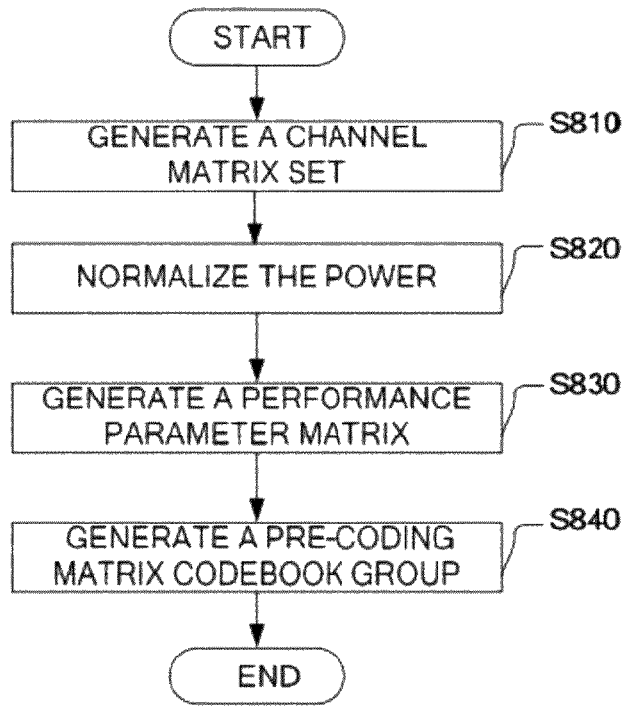

FIGS. 7-8 illustrate flowcharts of methods for acquiring a first predetermined number of pre-coding matrixes in first format in step S30 as illustrated in FIG. 1 according to other embodiments of the present invention, respectively. These embodiments are substantively the same as that as illustrated in FIG. 2, wherein steps S720 and S820 are corresponding to S110, steps S730 and S830 are corresponding to S120, and steps S740 and S840 are corresponding to S130. The distinction lies in that according to these embodiments, before generating the performance parameter matrix, the method further includes a step of power normalization. The step of power normalization may be performed before the step of generating the channel matrix set, as illustrated in FIG. 7, or after the step of generating the channel matrix set and before the step of generating the performance parameter matrix, as illustrated in FIG. 8. In the step of power normalization of the embodiments, a diagonal matrix with main diagonal elements equal or not completely equal to each other may be used as the power normalizing matrix to perform a power normalization for each pre-coding matrix in the universal set of pre-coding matrixes Similarly, the step of power normalization may be arranged after step S310 and before step S330 in FIG. 4. The step of power normalization may be performed before or after the step of generating the channel matrix set.

The above descriptions are just exemplary instead of limitations to the present invention. For example, P pre-coding matrixes in second format making the maximum contribution to the system performance may be selected as follows:

setting the selected first predetermined number of pre-coding matrixes in first format as a currently selected pre-coding matrix set, and setting the universal set of second pre-coding matrixes as a currently candidate pre-coding matrix set; and (1) selecting a pre-coding matrix in second format from the currently candidate pre-coding matrix set as an added pre-coding matrix;

(2) combining the selected pre-coding matrix in second format with the currently selected pre-coding matrix set to form a combined set of pre-coding matrixes;

(3) forming a performance parameter matrix with rows corresponding to pre-coding matrixes in the combined set of pre-coding matrixes and columns corresponding to channel matrixes in the channel matrix set, based on the combined set of pre-coding matrixes and the channel matrix set;

(4) calculating performance parameter values of the performance parameter matrix;

(5) repeating steps (1)-(4) for L times; each time selecting a different pre-coding matrix in second format, thereby obtaining L performance parameter values, wherein L is the number of pre-coding matrixes in the currently candidate pre-coding matrix set, and;

(6) setting a combined set of pre-coding matrixes corresponding to the performance parameter matrix corresponding to the maximum one of the L performance parameter values as the currently selected pre-coding matrix set;

(7) judging whether the number of pre-coding matrixes of the currently selected pre-coding matrix set is a sum of the first and second predetermined numbers; if yes, (8) outputting the pre-coding matrixes of the currently selected pre-coding matrix set as a pre-coding matrix codebook;

if the number of pre-coding matrixes of the currently selected pre-coding matrix set is not a sum of the first and second predetermined numbers, deleting the added pre-coding matrix corresponding to the maximum one of the L performance parameter values from the currently candidate pre-coding matrix set, and repeating the processing from step (1) for the currently selected pre-coding matrix set.

Next, the apparatus for generating pre-coding matrix codebook according to an embodiment of the present invention will be described with reference to the drawings.

Figure 9:
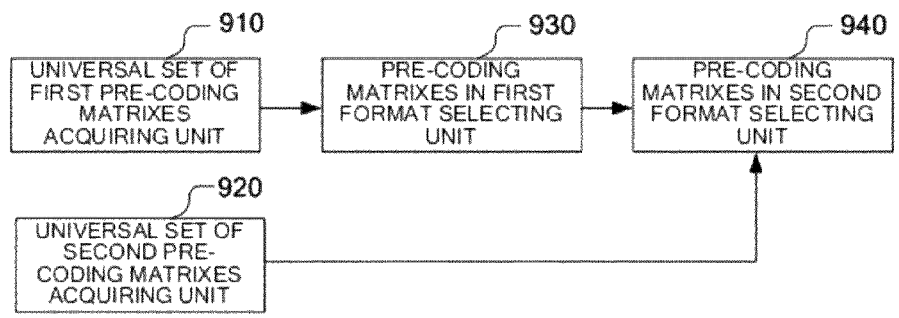
FIG. 9 schematically illustrates an apparatus for generating pre-coding matrix codebook according to an embodiment of the present invention.

FIG. 9 schematically illustrates an apparatus for generating pre-coding matrix codebook according to an embodiment of the present invention. As illustrated in FIG. 9, an apparatus for generating pre-coding matrix codebook according to an embodiment of the present invention includes a universal set of first pre-coding matrixes acquiring unit 910, a universal set of second pre-coding matrixes acquiring unit 920, a pre-coding matrixes in first format selecting unit 930 and a pre-coding matrixes in second format selecting unit 940.

The universal set of first pre-coding matrixes acquiring unit 910 acquires a universal set of pre-coding matrixes in first format (e.g., universal set of CMF pre-coding matrixes) by generating itself or reading from the external. The universal set of second pre-coding matrixes acquiring unit 920 is configured to acquire a universal set of pre-coding matrixes in second format (e.g., universal set of CMP pre-coding matrixes) by generating itself or reading from the external. The pre-coding matrixes in first format selecting unit 930 is configured to select a first predetermined number of pre-coding matrixes in first format from the universal set of pre-coding matrixes in first format acquired by the universal set of first pre-coding matrixes acquiring unit 910. The pre-coding matrixes in second format selecting unit 940 is configured to select a second predetermined number of pre-coding matrixes in second format from the universal set of pre-coding matrixes in second format acquired by the universal set of second pre-coding matrixes acquiring unit 920, according to the first predetermined number of pre-coding matrixes in first format selected by the pre-coding matrixes in first format selecting unit 930.

Figure 10:
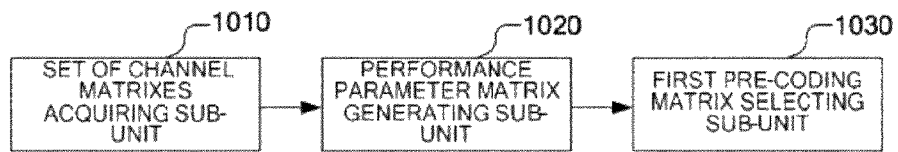
FIG. 10 illustrates a schematic structure diagram of a pre-coding matrix in first format selecting unit according to an embodiment of the present invention.

FIG. 10 illustrates a structure diagram of a pre-coding matrix in first format selecting unit according to an embodiment of the present invention. As illustrated in FIG. 10, the pre-coding matrix in first format selecting unit includes a channel matrix set acquiring sub-unit 1010, a performance parameter matrix generating sub-unit 1020 and a first pre-coding matrix selecting sub-unit 1030. The channel matrix set acquiring sub-unit 1010 is configured to acquire a channel matrix set of a communication system to be applied, by generating itself or reading (e.g., from the internal or external memory), $H=[H_1, H_2, H_3, \ldots, H_N]$, wherein N is an integer larger than 1. Each channel matrix $H_n (1 \leq n \leq N)$ is corresponding to one channel instance. Due to the channel randomness, the number N of the elements of the generated channel matrix set H shall be large enough to reflect the statistical characteristics of the channel.

According to an embodiment of the present invention, the performance parameter matrix generating sub-unit 1020 is configured to generate a performance parameter matrix TP of M1 rows and N columns based on the universal set of pre-coding matrixes in first format composed of M1 pre-coding matrixes and the channel matrix set, wherein M1 is a positive integer. In the performance parameter matrix TP, each row represents performance parameter values related to the same pre-coding matrix, and each column represents performance parameter values related to the same channel matrix.

The first pre-coding matrix selecting sub-unit 1030 is configured to select, based on the performance parameter matrix TP, a first predetermined number of pre-coding matrixes making maximum contributions to the system performance from the universal set of pre-coding matrixes according to the contributions to the performance parameter of the communication system made by respective pre-coding matrixes.

Figure 11:
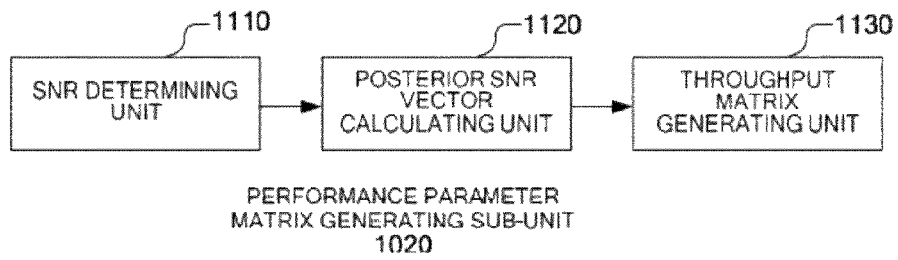
FIG. 11 illustrates a schematic block diagram of a performance parameter matrix generating unit according to an embodiment of the present invention.

FIG. 11 illustrates a block diagram of a performance parameter matrix generating unit according to an embodiment of the present invention. As illustrated in FIG. 11, a performance parameter matrix generating unit 1020 includes a SNR determining unit 1110, a posterior SNR vector calculating unit 1120 and a throughput matrix generating unit 1130.

According to an embodiment of the present invention, the SNR determining unit 1110 is configured to determine an SNR of the communication system.

According to this embodiment, the posterior SNR vector calculating unit 1120 is configured to calculate, based on the SNR, posterior SNR vectors of the communication system corresponding to respective pre-coding matrixes in the universal set of first pre-coding matrixes, for the channel instances corresponding to respective channel matrixes in the channel matrix set, thereby obtaining M×N posterior SNR vectors.

According to this embodiment, the throughput matrix generating unit 1130 is configured to convert the posterior SNR vectors into the throughput values of the communication system, and arrange all the throughput values in a throughput matrix TP of M1 rows and N columns, wherein each row represents the throughput values correlated to a same pre-coding matrix, each column represents the throughput values correlated to a same channel matrix, and each element represents the throughput value of the communication system when a pre-coding matrix correlated to the row where the element locates is used under a channel instance corresponding to the channel matrix correlated to the column where the element locates.

Figure 12:
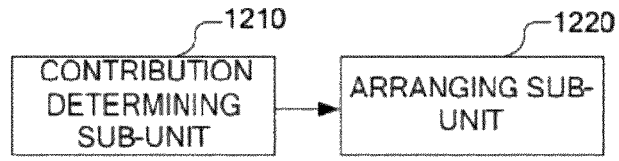
FIG. 12 illustrates a schematic block diagram of a pre-coding matrix selecting unit according to an embodiment of the present invention.

FIG. 12 illustrates a block diagram of a pre-coding matrix selecting unit according to an embodiment of the present invention. As illustrated in FIG. 12, the first pre-coding matrix selecting sub-unit 1030 includes a pre-coding matrix contribution determining sub-unit 1210 and a pre-coding matrix arranging sub-unit 1220.

According to an embodiment of the present invention, the pre-coding matrix contribution determining sub-unit 1210 is configured to perform a first level pre-coding matrixes sorting sub-processing for the performance parameter matrix TP, so as to determine a pre-coding matrix making the first minimum contribution to the performance parameter of the communication system, and orderly perform the second to M1-$K^{th}$ levels pre-coding matrixes sorting sub-processing, so as to determine M1-K pre-coding matrixes making the second to M1-$K^{th}$ minimum contributions to the performance parameter of the communication system, respectively. According to this embodiment, the pre-coding matrix arranging sub-unit 1220 is configured to acquire a first predetermined number of pre-coding matrixes in first format according to the M1-K pre-coding matrixes determined by the pre-coding matrix contribution determining sub-unit 1210.

The detailed operations of the pre-coding matrix arranging sub-unit 1220 and the pre-coding matrix contribution determining sub-unit 1210 may refer to the previous description of the matrix deletion method.

According to another embodiment of the present invention, the pre-coding matrix contribution determining sub-unit 1210 is configured to perform a first level pre-coding matrixes sorting sub-processing for the performance parameter matrix TP, so as to determine a pre-coding matrix making the first maximum contribution to the performance parameter of the communication system, and orderly perform the second to $K^{th}$ levels pre-coding matrixes sorting sub-processing, so as to determine K pre-coding matrixes making the second to $K^{th}$ maximum contributions to the performance parameter of the communication system, respectively.

According to this embodiment, the pre-coding matrix arranging sub-unit 1220 is configured to select K pre-coding matrixes according to the contributions to the performance parameter of the communication system made by the pre-coding matrixes.

The detailed operations of the pre-coding matrix arranging sub-unit 1220 and the pre-coding matrix contribution determining sub-unit 1210 may refer to the previous description of the matrix addition method.

Figure 13:
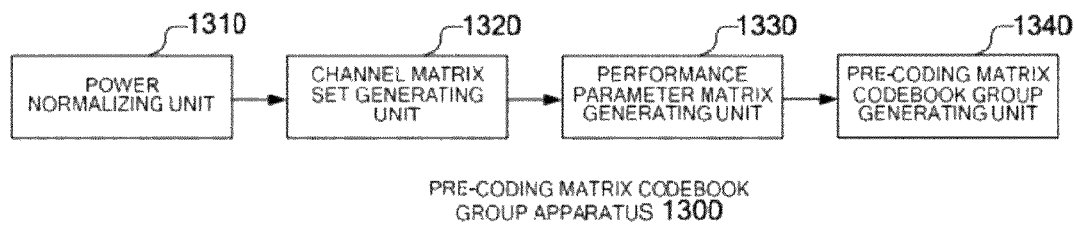
FIGS. 13-14 illustrate block diagrams of pre-coding matrix in first format selecting units according to other embodiments of the present invention.
Figure 14:
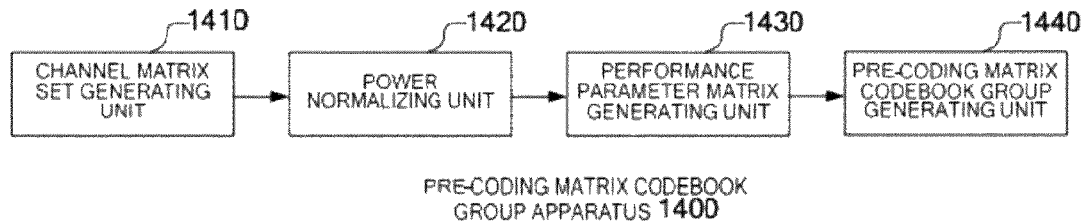

FIGS. 13-14 illustrate block diagrams of pre-coding matrixes in first format selecting units according to other embodiments of the present invention. As compared with the pre-coding matrixes in first format selecting unit as illustrated in FIG. 10, the pre-coding matrixes in first format selecting units as illustrated in FIGS. 13-14 further include a power normalizing unit 1310 and a power normalizing unit 1420, respectively.

The power normalizing units 1310 and 1420 have the same function. According to an embodiment of the present invention, the power normalizing units 1310 and 1420 are configured to perform a power normalization for each pre-coding matrix in the universal set of pre-coding matrixes by using a diagonal matrix with main diagonal elements equal or not completely equal to each other as the power normalizing matrix.

The distinction between the power normalizing units 1310 and 1420 is that in FIG. 13, the power normalizing unit 1310 is connected before the channel matrix set generating unit 1320. That is to say, the power normalizing unit 1310 performs the power normalization for the pre-coding matrixes in the universal set of pre-coding matrixes before the channel matrix set is generated. But in FIG. 14, the power normalizing unit 1420 is connected after the channel matrix set generating unit 1410 and before the performance parameter matrix generating unit 1430. That is to say, the power normalizing unit 1420 performs the power normalization for the pre-coding matrixes in the universal set of pre-coding matrixes after the channel matrix set is generated and before the performance parameter matrix is generated.

Figure 15:
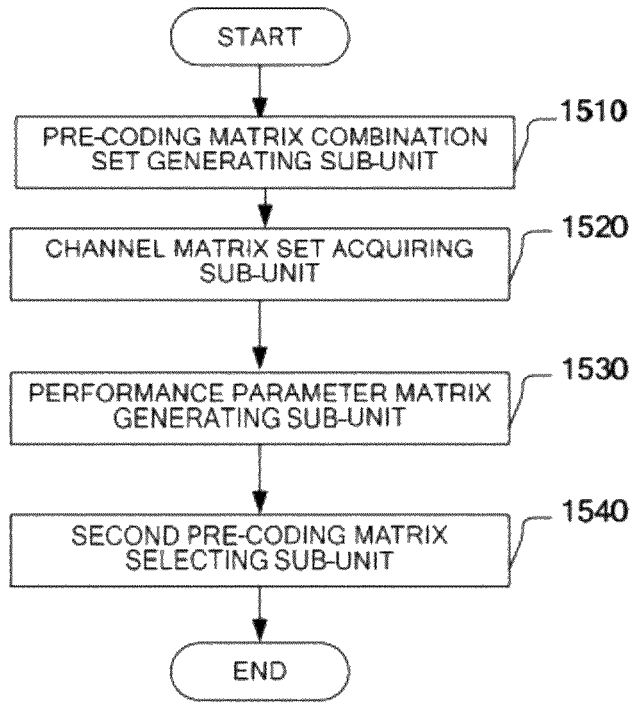
FIG. 15 illustrates a schematic structure diagram of a pre-coding matrix in second format selecting unit according to an embodiment of the present invention.

FIG. 15 schematically illustrates the structure of the pre-coding matrixes in second format selecting unit according to an embodiment of this invention. As shown in FIG. 15, the pre-coding matrixes in second format selecting unit includes a combined set of pre-coding matrixes generating sub-unit 1510, a channel matrix set acquiring sub-unit 1520, a performance parameter matrix generating sub-unit 1530 and a second pre-coding matrix selecting sub-unit 1540.

The combined set of pre-coding matrixes generating sub-unit 1510 combines the selected first predetermined number of first pre-coding matrixes with the universal set of second pre-coding matrixes to generate a combined set of pre-coding matrixes. In case 10 first (CMF) pre-coding matrixes are selected from the universal set of first pre-coding matrixes and the second pre-coding matrixes are CMP pre-coding matrixes, the pre-coding matrix combination set for example includes 34 pre-coding matrixes, when the number of the antennas is 4.

The channel matrix set acquiring sub-unit 1520 acquires a channel matrix set H=[$H_1, H_2, H_3, \ldots, H_N$] by generating the channel matrix set by itself, or by reading from for example its memory or external memory, wherein N is an integer larger than 1. Each channel matrix $H_n$ (1≤n≤N) is corresponding to one channel instance. The method for generating the channel matrix set H=[$H_1, H_2, H_3, \ldots, H_N$] can refer to the description for the above methods.

The performance parameter matrix generating sub-unit 1530 generates a performance parameter matrix TP of M rows and N columns. In the performance parameter matrix TP, each row represents the values of performance parameters correlated to a same pre-coding matrix, and each column represents the values of performance parameters correlated to a same channel matrix. The method for generating the performance parameter matrix TP can refer to the description for the above methods.

The second pre-coding matrix selecting sub-unit 1540 selects second predetermined number of pre-coding matrixes in second format according to the generated performance parameter matrix TP.

Figure 16:
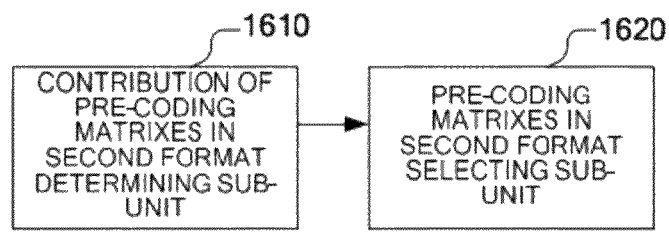
FIG. 16 illustrates a schematic structure diagram of a second pre-coding matrix format selecting sub-unit according to an embodiment of the present invention.

FIG. 16 schematically illustrates the structure of the second pre-coding matrix selecting sub-unit 1540 according to an embodiment of this invention.

As shown in FIG. 16, the second pre-coding matrix selecting sub-unit 1540 includes a contribution of pre-coding matrixes in second format determining sub-unit 1610 and a pre-coding matrixes in second format selecting sub-unit 1620.

According to an embodiment of this invention, the contribution of pre-coding matrixes in second format determining sub-unit 1610 is configured to perform a first level pre-coding matrixes sorting sub-processing for the performance parameter matrix TP, to determine a pre-coding matrix in second format making a minimum contribution to the performance parameter of the communication system, and orderly perform the second to (M2−P)$^{th}$ levels pre-coding matrixes sorting sub-processing to determine the pre-coding matrixes in second format making the second to (M2−P)$^{th}$ minimum contributions to the performance parameter of the communication system. The pre-coding matrixes in second format selecting sub-unit 1620 is configured to delete these M2−P pre-coding matrixes in second format from the universal set of pre-coding matrixes in second format to, thereby acquiring the P pre-coding matrixes in second format to be selected.

According to another embodiment of this invention, the contribution of pre-coding matrixes in second format determining sub-unit 1610 is configured to perform a first level pre-coding matrixes sorting sub-processing for the performance parameter matrix TP, to determine a pre-coding matrix in second format making a maximum contribution to the performance parameter of the communication system, and perform the second to P$^{th}$ levels pre-coding matrixes sorting sub-processing to determine pre-coding matrixes in second format making the second to P$^{th}$ maximum contributions to the performance parameter of the communication system. The pre-coding matrixes in second format selecting sub-unit 1620 is configured to determine these P pre-coding matrixes in second format as the P pre-coding matrixes in second format to be selected.

The operations of the contribution of pre-coding matrixes in second format determining sub-unit 1610 and pre-coding matrixes in second format selecting sub-unit 1620 can be understood by referring to FIGS. 5-6 and the descriptions thereof.

The further detailed operation of each unit in the above apparatuses could refer to embodiments of the corresponding method, and is omitted herein.

Various constituent modules, units and subunits in the above apparatus may be configured through software, firmware, hardware or combinations thereof. The configuring means or manners are well known by a person skilled in the art, and herein are not repeated. In case of the implementation through software or firmware, programs constructing the software shall be installed from a storage medium or network to a computer with dedicated hardware structure (e.g., a general computer as illustrated in FIG. 17), and the computer can perform various functions when being installed with various programs.

Figure 17:
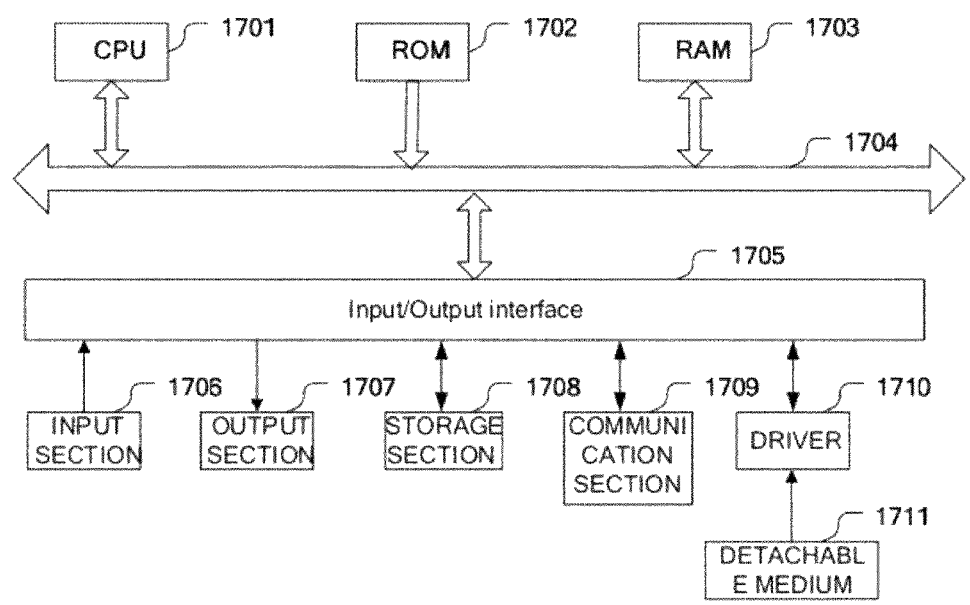
FIG. 17 illustrates a schematic block diagram of a computer capable of implementing the method and apparatus according to the embodiment of the present invention.

FIG. 17 illustrates a block diagram of a computer capable of implementing the method and apparatus according to the embodiments of the present invention.

In FIG. 17, a Central Processing Unit (CPU) 1701 performs various processing according to programs stored in a Read Only Memory (ROM) 1702 or programs loaded from a storage section 1708 to a Random Access Memory (RAM) 1703. Data required by the CPU 1701 to perform various processing shall be stored in the RAM 1703 as necessary. The CPU 1701, the ROM 1702 and the RAM 1703 are connected to each other via a bus 1704. An Input/Output (I/O) interface 1705 may also be connected to the bus 1704 upon request.

As necessary, the following components may be connected to the I/O interface 1705: an input section 1706 (including keypad, mouse, etc.), an output section 1707 (including display such as Cathode-Ray Tube (CRT) and Liquid Crystal Display (LCD), and loudspeaker, etc.), a storage section 1708 (including hard disk, etc.) and a communication section 1709 (including network interface card such as LAN card, modem, etc.). The communication section 1709 for example performs a communication processing through a network such as Internet. A driver 1710 may also be connected to the I/O interface 1705 as necessary. A detachable medium 1711 such as magnetic disk, optical disk, magnetic optical disk, semiconductor memory, etc. may be mounted on the driver 1710 as necessary, so that the computer program read therefrom will be installed into the storage section 1708 upon request.

In case the above series of processing is implemented through software, programs constructing the software shall be installed from a network such as the Internet or a storage medium such as the detachable medium 1711.

A person skilled in the art shall appreciate that the storage medium is not limited to the detachable medium 1711 as illustrated in FIG. 17 which stores programs and was distributed independently from the device to provide the programs to the subscriber. The detachable medium 1711 for example includes magnetic disk (including floppy disk (registered trademark)), compact disk (including Compact Disk Read Only Memory (CD-ROM) and Digital Versatile Disk (DVD)), magnetic optical disk (including Mini Disk (MD) (registered trademark)) and semiconductor memory. Or the storage medium may be the ROM 1702, the hard disk in the storage section 1708, etc. in which programs are stored and distributed to the subscriber together with the device containing them.

The present invention further provides a program product that stores machine readable instruction codes capable of executing the above method according to the embodiment of the present invention when being read and executed by a machine.

Accordingly, a storage medium for loading the program product that stores the machine readable instruction codes is also included in the disclosure of the present invention. The storage medium includes, but not limited to, floppy disk, optical disk, magnetic optical disk, memory card, memory stick, etc.

The examples obtained by the above method or apparatus according to this application are shown as follow. In these examples, a first predetermined number of pre-coding matrixes in the CMF format are extracted from the universal set of pre-coding matrixes in the CMF format, and a second predetermined number of pre-coding matrixes in the CMP format are extracted from the universal set of pre-coding matrixes in the CMP format. The extracted pre-coding matrixes compose a pre-coding matrix codebook.

Table 1 shows an universal set $PC_{MF}$ of pre-coding matrixes in CMF format to be applied to a MIMO communication system which supports transmission layer of 3 (i.e. rank of 3). In case the equal power for each transmission layer is needed, the universal set of pre-coding matrixes shown in Table 1 is power normalized by the following power normalizing matrix:

TABLE 1

$$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 1 | | | 2 | | | 3 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| 0.5 | 0 | −0.7071 | 0.5 | 0 | −0.7071 | 0.5 | −0.7071 | 0 |

| 4 | | | 5 | | | 6 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| 0.5 | 0 | −0.7071 | 0.5 | 0 | 0.7071i | 0.5 | −0.7071 | 0 |

| 7 | | | 8 | | | 9 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| 0.5 | 0 | −0.7071 | 0.5 | 0 | 0.7071 | 0.5 | −0.7071 | 0 |

| 10 | | | 11 | | | 12 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| 0.5 | 0 | −0.7071 | 0.5 | 0 | −0.7071i | 0.5 | −0.7071 | 0 |

| 13 | | | 14 | | | 15 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| 0.5 | 0 | 0.7071i | 0.5 | 0 | −0.7071 | 0.5 | −0.7071 | 0 |

| 16 | | | 17 | | | 18 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| 0.5 | 0 | 0.7071i | 0.5 | 0 | 0.7071i | 0.5 | −0.7071 | 0 |

| 19 | | | 20 | | | 21 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| 0.5 | 0 | 0.7071i | 0.5 | 0 | 0.7071 | 0.5 | −0.7071 | 0 |

| 22 | | | 23 | | | 24 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| 0.5 | 0 | 0.7071i | 0.5 | 0 | −0.7071i | 0.5 | −0.7071 | 0 |

| 25 | | | 26 | | | 27 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| 0.5 | 0 | 0.7071 | 0.5 | 0 | −0.7071 | 0.5 | −0.7071 | 0 |

| 28 | | | 29 | | | 30 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| 0.5 | 0 | 0.7071 | 0.5 | 0 | 0.7071i | 0.5 | −0.7071 | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 31 | | | 32 | | | 33 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| 0.5 | 0 | 0.7071 | 0.5 | 0 | 0.7071 | 0.5 | −0.7071 | 0 |

| 34 | | | 35 | | | 36 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| 0.5 | 0 | 0.7071 | 0.5 | 0 | −0.7071i | 0.5 | −0.7071 | 0 |

| 37 | | | 38 | | | 39 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| 0.5 | 0 | −0.7071i | 0.5 | 0 | −0.7071 | 0.5 | −0.7071 | 0 |

| 40 | | | 41 | | | 42 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| 0.5 | 0 | −0.7071i | 0.5 | 0 | 0.7071i | 0.5 | −0.7071 | 0 |

| 43 | | | 44 | | | 45 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| 0.5 | 0 | −0.7071i | 0.5 | 0 | 0.7071 | 0.5 | −0.7071 | 0 |

| 46 | | | 47 | | | 48 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| 0.5 | 0 | −0.7071i | 0.5 | 0 | −0.7071i | 0.5 | −0.7071 | 0 |

| 49 | | | 50 | | | 51 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| 0.5i | 0 | −0.7071i | 0.5i | 0 | −0.7071i | 0.5i | −0.7071i | 0 |

| 52 | | | 53 | | | 54 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| 0.5i | 0 | −0.7071i | 0.5i | 0 | −0.7071i | 0.5i | −0.7071i | 0 |

| 55 | | | 56 | | | 57 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| 0.5i | 0 | −0.7071i | 0.5i | 0 | 0.7071i | 0.5i | −0.7071i | 0 |

| 58 | | | 59 | | | 60 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| 0.5i | 0 | −0.7071i | 0.5i | 0 | 0.7071 | 0.5i | −0.7071i | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 61 | | | 62 | | | 63 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| 0.5i | 0 | −0.7071 | 0.5i | 0 | −0.7071i | 0.5i | −0.7071i | 0 |

| 64 | | | 65 | | | 66 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| 0.5i | 0 | −0.7071 | 0.5i | 0 | −0.7071 | 0.5i | −0.7071i | 0 |

| 67 | | | 68 | | | 69 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| 0.5i | 0 | −0.7071 | 0.5i | 0 | 0.7071i | 0.5i | −0.7071i | 0 |

| 70 | | | 71 | | | 72 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| 0.5i | 0 | −0.7071 | 0.5i | 0 | 0.7071 | 0.5i | −0.7071i | 0 |

| 73 | | | 74 | | | 75 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| 0.5i | 0 | 0.7071i | 0.5i | 0 | −0.7071i | 0.5i | −0.7071i | 0 |

| 76 | | | 77 | | | 78 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| 0.5i | 0 | 0.7071i | 0.5i | 0 | −0.7071 | 0.5i | −0.7071i | 0 |

| 79 | | | 80 | | | 81 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| 0.5i | 0 | 0.7071i | 0.5i | 0 | 0.7071i | 0.5i | −0.7071i | 0 |

| 82 | | | 83 | | | 84 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| 0.5i | 0 | 0.7071i | 0.5i | 0 | 0.7071 | 0.5i | −0.7071i | 0 |

| 85 | | | 86 | | | 87 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| 0.5i | 0 | 0.7071 | 0.5i | 0 | −0.7071i | 0.5i | −0.7071i | 0 |

| 88 | | | 89 | | | 90 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| 0.5i | 0 | 0.7071 | 0.5i | 0 | −0.7071 | 0.5i | −0.7071i | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 91 | | | 92 | | | 93 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| 0.5i | 0 | 0.7071 | 0.5i | 0 | 0.7071 | 0.5i | −0.7071i | 0 |

| 94 | | | 95 | | | 96 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| 0.5i | 0 | 0.7071 | 0.5i | 0 | 0.7071 | 0.5i | −0.7071i | 0 |

| 97 | | | 98 | | | 99 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| −0.5 | 0 | 0.7071 | −0.5 | 0 | 0.7071 | −0.5 | 0.7071 | 0 |

| 100 | | | 101 | | | 102 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| −0.5 | 0 | 0.7071 | −0.5 | 0 | −0.7071i | −0.5 | 0.7071 | 0 |

| 103 | | | 104 | | | 105 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| −0.5 | 0 | 0.7071 | −0.5 | 0 | −0.7071 | −0.5 | 0.7071 | 0 |

| 106 | | | 107 | | | 108 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| −0.5 | 0 | 0.7071 | −0.5 | 0 | 0.7071i | −0.5 | 0.7071 | 0 |

| 109 | | | 110 | | | 111 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| −0.5 | 0 | −0.7071i | −0.5 | 0 | 0.7071 | −0.5 | 0.7071 | 0 |

| 112 | | | 113 | | | 114 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| −0.5 | 0 | −0.7071i | −0.5 | 0 | −0.7071i | −0.5 | 0.7071 | 0 |

| 115 | | | 116 | | | 117 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| −0.5 | 0 | −0.7071i | −0.5 | 0 | −0.7071 | −0.5 | 0.7071 | 0 |

| 118 | | | 119 | | | 120 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| −0.5 | 0 | −0.7071i | −0.5 | 0 | 0.7071i | −0.5 | 0.7071 | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 121 | | | 122 | | | 123 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| −0.5 | 0 | −0.7071 | −0.5 | 0 | 0.7071 | −0.5 | 0.7071 | 0 |

| 124 | | | 125 | | | 126 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| −0.5 | 0 | −0.7071 | −0.5 | 0 | −0.7071i | −0.5 | 0.7071 | 0 |

| 127 | | | 128 | | | 129 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| −0.5 | 0 | −0.7071 | −0.5 | 0 | −0.7071 | −0.5 | 0.7071 | 0 |

| 130 | | | 131 | | | 132 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| −0.5 | 0 | −0.7071 | −0.5 | 0 | 0.7071i | −0.5 | 0.7071 | 0 |

| 133 | | | 134 | | | 135 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| −0.5 | 0 | 0.7071i | −0.5 | 0 | 0.7071 | −0.5 | 0.7071 | 0 |

| 136 | | | 137 | | | 138 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| −0.5 | 0 | 0.7071i | −0.5 | 0 | −0.7071i | −0.5 | 0.7071 | 0 |

| 139 | | | 140 | | | 141 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| −0.5 | 0 | 0.7071i | −0.5 | 0 | −0.7071 | −0.5 | 0.7071 | 0 |

| 142 | | | 143 | | | 144 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| −0.5 | 0 | 0.7071i | −0.5 | 0 | 0.7071i | −0.5 | 0.7071 | 0 |

| 145 | | | 146 | | | 147 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5 | 0 | 0.7071 | 0.5 | −0.7071 | 0 | 0.5 | 0 | −0.7071 |
| −0.5i | 0 | 0.7071i | −0.5i | 0 | 0.7071i | −0.5i | 0.7071i | 0 |

| 148 | | | 149 | | | 150 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5 | 0 | 0.7071 | 0.5 | −0.7071 | 0 | 0.5 | 0 | 0.7071i |
| −0.5i | 0 | 0.7071i | −0.5i | 0 | 0.7071 | −0.5i | 0.7071i | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 151 | | | 152 | | | 153 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5 | 0 | 0.7071 | 0.5 | −0.7071 | 0 | 0.5 | 0 | 0.7071 |
| −0.5i | 0 | 0.7071i | −0.5i | 0 | −0.7071i | −0.5i | 0.7071i | 0 |

| 154 | | | 155 | | | 156 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5 | 0 | 0.7071 | 0.5 | −0.7071 | 0 | 0.5 | 0 | −0.7071i |
| −0.5i | 0 | 0.7071i | −0.5i | 0 | −0.7071 | −0.5i | 0.7071i | 0 |

| 157 | | | 158 | | | 159 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| 0.5i | 0 | 0.7071 | 0.5i | −0.7071i | 0 | 0.5i | 0 | −0.7071i |
| −0.5i | 0 | 0.7071 | −0.5i | 0 | 0.7071i | −0.5i | 0.7071i | 0 |

| 160 | | | 161 | | | 162 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| 0.5i | 0 | 0.7071 | 0.5i | −0.7071i | 0 | 0.5i | 0 | −0.7071 |
| −0.5i | 0 | 0.7071 | −0.5i | 0 | 0.7071 | −0.5i | 0.7071i | 0 |

| 163 | | | 164 | | | 165 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| 0.5i | 0 | 0.7071 | 0.5i | −0.7071i | 0 | 0.5i | 0 | 0.7071i |
| −0.5i | 0 | 0.7071 | −0.5i | 0 | −0.7071i | −0.5i | 0.7071i | 0 |

| 166 | | | 167 | | | 168 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| 0.5i | 0 | 0.7071 | 0.5i | −0.7071i | 0 | 0.5i | 0 | 0.7071 |
| −0.5i | 0 | 0.7071 | −0.5i | 0 | −0.7071 | −0.5i | 0.7071i | 0 |

| 169 | | | 170 | | | 171 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5 | 0 | 0.7071 | −0.5 | 0.7071 | 0 | −0.5 | 0 | 0.7071 |
| −0.5i | 0 | −0.7071i | −0.5i | 0 | 0.7071i | −0.5i | 0.7071i | 0 |

| 172 | | | 173 | | | 174 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5 | 0 | 0.7071 | −0.5 | 0.7071 | 0 | −0.5 | 0 | −0.7071i |
| −0.5i | 0 | −0.7071i | −0.5i | 0 | 0.7071 | −0.5i | 0.7071i | 0 |

| 175 | | | 176 | | | 177 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5 | 0 | 0.7071 | −0.5 | 0.7071 | 0 | −0.5 | 0 | −0.7071 |
| −0.5i | 0 | −0.7071i | −0.5i | 0 | −0.7071i | −0.5i | 0.7071i | 0 |

| 178 | | | 179 | | | 180 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5 | 0 | 0.7071 | −0.5 | 0.7071 | 0 | −0.5 | 0 | 0.7071i |
| −0.5i | 0 | −0.7071i | −0.5i | 0 | −0.7071 | −0.5i | 0.7071i | 0 |

TABLE 1-continued $$\Lambda = \begin{bmatrix} 1/\sqrt{3} & 0 & 0 \\ 0 & 1/\sqrt{3} & 0 \\ 0 & 0 & 1/\sqrt{3} \end{bmatrix}$$

| 181 | | | 182 | | | 183 | | |
|---|---|---|---|---|---|---|---|---|
| 0.5 | 0.7071 | 0 | 0.5 | 0.7071 | 0 | 0.5 | 0.7071 | 0 |
| 0.5 | −0.7071 | 0 | 0.5 | 0 | 0.7071 | 0.5 | 0 | 0.7071 |
| −0.5i | 0 | 0.7071 | −0.5i | 0.7071i | 0 | −0.5i | 0 | 0.7071i |
| −0.5i | 0 | −0.7071 | −0.5i | 0 | 0.7071i | −0.5i | 0.7071i | 0 |

| 184 | | | 185 | | | 186 | | |
|---|---|---|---|---|---|---|---|---|
| 0.5 | 0.7071 | 0 | 0.5 | 0.7071 | 0 | 0.5 | 0.7071 | 0 |
| 0.5i | −0.7071i | 0 | 0.5i | 0 | 0.7071 | 0.5i | 0 | 0.7071 |
| −0.5i | 0 | 0.7071 | −0.5i | 0.7071i | 0 | −0.5i | 0 | 0.7071 |
| −0.5i | 0 | −0.7071 | −0.5i | 0 | 0.7071 | −0.5i | 0.7071i | 0 |

| 187 | | | 188 | | | 189 | | |
|---|---|---|---|---|---|---|---|---|
| 0.5 | 0.7071 | 0 | 0.5 | 0.7071 | 0 | 0.5 | 0.7071 | 0 |
| −0.5 | 0.7071 | 0 | −0.5 | 0 | 0.7071 | −0.5 | 0 | 0.7071 |
| −0.5i | 0 | 0.7071 | −0.5i | 0.7071i | 0 | −0.5i | 0 | −0.7071i |
| −0.5i | 0 | −0.7071 | −0.5i | 0 | −0.7071i | −0.5i | 0.7071i | 0 |

| 190 | | | 191 | | | 192 | | |
|---|---|---|---|---|---|---|---|---|
| 0.5 | 0.7071 | 0 | 0.5 | 0.7071 | 0 | 0.5 | 0.7071 | 0 |
| −0.5i | 0.7071i | 0 | −0.5i | 0 | 0.7071 | −0.5i | 0 | 0.7071 |
| −0.5i | 0 | 0.7071 | −0.5i | 0.7071i | 0 | −0.5i | 0 | −0.7071 |
| −0.5i | 0 | −0.7071 | −0.5i | 0 | −0.7071 | −0.5i | 0.7071i | 0 |

The numbers 1-192 in Table 1 indicate the serial number of each of the pre-coding matrixes. Each of the pre-coding matrixes has 4 rows and 3 columns.

Table 2 shows an universal set $P_{CMP}$ of pre-coding matrixes in CMP format to be applied to a MIMO communication system which supports transmission layer of 3 (i.e. rank of 3). The numbers 1-24 in Table 2 indicate the serial number of each of the pre-coding matrixes. Each of the pre-coding matrixes has 4 rows and 3 columns.

TABLE 2

| 1 | | | 2 | | | 3 | | |
|---|---|---|---|---|---|---|---|---|
| 0.5 | 0 | 0 | 0.5 | 0 | 0 | 0.5 | 0 | 0 |
| 0.5 | 0 | 0 | 0.5000i | 0 | 0 | −0.5 | 0 | 0 |
| 0 | 0.5 | 0 | 0 | 0.5 | 0 | 0 | 0.5 | 0 |
| 0 | 0 | 0.5 | 0 | 0 | 0.5 | 0 | 0 | 0.5 |

| 4 | | | 5 | | | 6 | | |
|---|---|---|---|---|---|---|---|---|
| 0.5 | 0 | 0 | 0.5 | 0 | 0 | 0.5 | 0 | 0 |
| −0.5000i | 0 | 0 | 0 | 0.5 | 0 | 0 | 0.5 | 0 |
| 0 | 0.5 | 0 | 0.5 | 0 | 0 | 0.5000i | 0 | 0 |
| 0 | 0 | 0.5 | 0 | 0 | 0.5 | 0 | 0 | 0.5 |

| 7 | | | 8 | | | 9 | | |
|---|---|---|---|---|---|---|---|---|
| 0.5 | 0 | 0 | 0.5 | 0 | 0 | 0.5 | 0 | 0 |
| 0 | 0.5 | 0 | 0 | 0.5 | 0 | 0 | 0 | 0.5 |
| −0.5 | 0 | 0 | −0.5000i | 0 | 0 | 0 | 0.5 | 0 |
| 0 | 0 | 0.5 | 0 | 0 | 0.5 | 0.5 | 0 | 0 |

| 10 | | | 11 | | | 12 | | |
|---|---|---|---|---|---|---|---|---|
| 0.5 | 0 | 0 | 0.5 | 0 | 0 | 0.5 | 0 | 0 |
| 0 | 0.5 | 0 | 0 | 0.5 | 0 | 0 | 0 | 0.5 |
| 0 | 0 | 0.5 | 0 | 0 | 0.5 | 0 | 0.5 | 0 |
| 0.5000i | 0 | 0 | −0.5 | 0 | 0 | −0.5000i | 0 | 0 |

| 13 | | | 14 | | | 15 | | |
|---|---|---|---|---|---|---|---|---|
| 0 | 0.5 | 0 | 0 | 0.5 | 0 | 0 | 0.5 | 0 |
| 0.5 | 0 | 0 | 0.5 | 0 | 0 | 0.5 | 0 | 0 |
| 0.5 | 0 | 0 | 0.5000i | 0 | 0 | −0.5 | 0 | 0 |
| 0 | 0 | 0.5 | 0 | 0 | 0.5 | 0 | 0 | 0.5 |

| 16 | | | 17 | | | 18 | | |
|---|---|---|---|---|---|---|---|---|
| 0 | 0.5 | 0 | 0 | 0.5 | 0 | 0 | 0.5 | 0 |
| 0.5 | 0 | 0 | 0.5 | 0 | 0 | 0.5 | 0 | 0 |
| −0.5000i | 0 | 0 | 0 | 0 | 0.5 | 0 | 0 | 0.5 |
| 0 | 0 | 0.5 | 0.5 | 0 | 0 | 0.5000i | 0 | 0 |

| 19 | | | 20 | | | 21 | | |
|---|---|---|---|---|---|---|---|---|
| 0 | 0.5 | 0 | 0 | 0.5 | 0 | 0 | 0.5 | 0 |
| 0.5 | 0 | 0 | 0.5 | 0 | 0 | 0 | 0 | 0.5 |
| 0 | 0 | 0.5 | 0 | 0 | 0.5 | 0.5 | 0 | 0 |
| −0.5 | 0 | 0 | −0.5000i | 0 | 0 | 0.5 | 0 | 0 |

| 22 | | | 23 | | | 24 | | |
|---|---|---|---|---|---|---|---|---|
| 0 | 0.5 | 0 | 0 | 0.5 | 0 | 0 | 0.5 | 0 |
| 0 | 0 | 0.5 | 0 | 0 | 0.5 | 0 | 0 | 0.5 |
| 0.5 | 0 | 0 | 0.5 | 0 | 0 | 0.5 | 0 | 0 |
| 0.5000i | 0 | 0 | −0.5 | 0 | 0 | −0.5000i | 0 | 0 |

The following pre-coding matrix codebook can be obtained by using $2 \times 10^5$ channel instance, when the statistical characteristic of channels meets that of independent Rayleigh fading channel.

When the pre-coding matrix codebook consists of ten pre-coding matrixes in CMF format and ten pre-coding matrixes in CMP format, the CMF pre-coding matrixes may be:

[106 64 23 41 123 33 189 187 134 57]

and the CMP pre-coding matrixes may be:

[2 4 5 7 10 14 17 19 22 24]

When the pre-coding matrix codebook consists of 11 pre-coding matrixes in CMF format and 9 pre-coding matrixes in CMP format,
the CMF pre-coding matrixes may be:

[103 31 1 104 60 180 150 78 41 23 113]

and the CMP pre-coding matrixes may be:

[1 3 6 8 11 13 18 21 23]

When the pre-coding matrix codebook consists of 12 pre-coding matrixes in CMF format and 8 pre-coding matrixes in CMP format,
the CMF pre-coding matrixes may be:

[103 31 1 104 60 180 150 78 41 23 113 143]

and the CMP pre-coding matrixes may be:

[1 3 10 12 14 16 21 23]

When the pre-coding matrix codebook consists of 13 pre-coding matrixes in CMF format and 7 pre-coding matrixes in CMP format,
the CMF pre-coding matrixes may be:

[103 31 1 104 60 180 150 78 41 23 113 143 85]

and the CMP pre-coding matrixes may be:

[1 3 6 12 14 20 23]

When the pre-coding matrix codebook consists of 14 pre-coding matrixes in CMF format and 6 pre-coding matrixes in CMP format,
the CMF pre-coding matrixes may be:

[99 127 97 8 47 136 17 118 183 93 165 63 155 83]

and the CMP pre-coding matrixes may be:

[2 5 7 17 19 22]

When the pre-coding matrix codebook consists of 15 pre-coding matrixes in CMF format and 5 pre-coding matrixes in CMP format:
the CMF pre-coding matrixes may be:

[99 127 97 8 47 136 17 118 183 93 165 63 155 83 53]

and the CMP pre-coding matrixes may be:

[2 5 12 17 22]

When the pre-coding matrix codebook consists of 16 pre-coding matrixes in CMF format and 4 pre-coding matrixes in CMP format:
the CMF pre-coding matrixes may be:

[99 127 97 8 47 136 17 118 183 93 165 63 155 83 53 173]

and the CMP pre-coding matrixes may be:

[9 11 13 15]

When the pre-coding matrix codebook consists of 17 pre-coding matrixes in CMF format and 3 pre-coding matrixes in CMP format:
the CMF pre-coding matrixes may be:

[124 4 34 125 192 72 89 161 43 13 15 133 152 80 50 170 102]

and the CMP pre-coding matrixes may be:

[11 16 21]

When the pre-coding matrix codebook consists of 18 pre-coding matrixes in CMF format and 2 pre-coding matrixes in CMP format:
the CMF pre-coding matrixes may be:

[44 135 45 115 35 124 106 5 162 72 192 90 49 79 151 169 167 65]

and the CMP pre-coding matrixes may be:

[6 17]

When the pre-coding matrix codebook consists of 19 pre-coding matrixes in CMF format and 1 pre-coding matrixes in CMP format:
the CMF pre-coding matrixes may be:

[65 167 95 66 19 109 141 39 29
101 131 11 57 177 75 147 34 4 106]

and the CMP pre-coding matrixes may be:
When the pre-coding matrix codebook consists of 20 pre-coding matrixes in CMF format,
the CMF pre-coding matrixes may be:

[2 4 5 6 7 8 9 10 11 12 13 14 15 16 17
18 19 20 22 24]

In the description of the embodiments of this invention, features described and/or illustrated with respect to one embodiment can be used in one or more other embodiments in a same or similar way, and/or combine with or replace features in other embodiments.

To be noted, the term "include/comprise" or "including/comprising" herein refers to existence of feature, component, step or assembly, not excluding existence or addition of one or more other features, components, steps, assemblies or a combination thereof.

In addition, the method of the present invention is not limited to be executed according to the time order as described herein, and can be executed in other time sequentially, concurrently or independently. Thus, the execution order of the method as described herein does not limit the technical scope of the present invention.

What is claimed is:

1. A method for generating pre-coding matrix codebook, comprising:
    acquiring a universal set of pre-coding matrixes in a first format;
    acquiring a universal set of pre-coding matrixes in a second format;
    selecting a first predetermined number of pre-coding matrixes in the first format from the universal set of pre-coding matrixes in the first format; and
    selecting a second predetermined number of pre-coding matrixes in the second format from the universal set of pre-coding matrixes in the second format, according to the selected first predetermined number of pre-coding matrixes in the first format;
    wherein the selecting the second predetermined number of pre-coding matrixes in the second format from the universal set of pre-coding matrixes in the second format comprises:
    merging the selected first predetermined number of pre-coding matrixes in the first format with the universal set of pre-coding matrixes in the second format, so as to form a combined set of pre-coding matrixes;
    forming a set of channel matrixes of a communication system to which the pre-coding matrixes are applied, and each of the channel matrixes is corresponding to one channel example;
    forming a performance parameter matrix according to the combined set of pre-coding matrixes and the set of channel matrixes, each row of the performance parameter matrix represents performance parameter values related to the same pre-coding matrix, and each column represents performance parameter values related to the same channel matrix; and
    selecting the second predetermined number of pre-coding matrixes in the second format making a maximum contribution to the performance of the communication system, by using the performance parameter matrix and according to contributions to the performance of the communication system made by the respective pre-coding matrixes in the second format.

2. The method for generating pre-coding matrix codebook according to claim 1, wherein the selecting the second predetermined number of pre-coding matrixes in the second format making a maximum contribution to the performance of the communication system is performed by stepwise decreasing rows in the performance parameter matrix corresponding to pre-coding matrixes in the second format making a minimum contribution to the performance of the communication system.

3. The method for generating pre-coding matrix codebook according to claim 1, wherein the selecting the second predetermined number of pre-coding matrixes in the second format making a maximum contribution to the performance of the communication system is performed by stepwise increasing rows corresponding to pre-coding matrixes in the second format making the maximum contribution to the performance of the communication system, based on rows in the performance parameter matrix corresponding to the first predetermined number of pre-coding matrixes in the first format.

4. The method for generating pre-coding matrix codebook according to claim 2, wherein the selecting the second predetermined number of pre-coding matrixes in the second format making a maximum contribution to the performance of the communication system is performed by:
    1) deleting a row corresponding to the pre-coding matrixes in the second format from the performance parameter matrix of M rows and N columns, so as to obtain a performance parameter matrix of M−1 rows and N columns, where M is the number of rows in the current performance parameter matrix, M=K+M2, K is the number of pre-coding matrixes in the first format in the performance parameter matrix, M2 is the number of pre-coding matrixes in the second format in the performance parameter matrix, and N is the number of columns in the performance parameter matrix;
    2) calculating performance parameters values of the performance parameter matrix of M−1 rows and N columns,
    3) repeating processes 1) and 2) for M2 times, and each time deleting a row corresponding to a different pre-coding matrix in the second format from the performance parameter matrix, so as to obtain M2 performance parameters values,
    4) taking a performance parameter matrix of M−1 rows and N columns, which is corresponding to a maximum one among the M2 performance parameters values, as a new performance parameter matrix, 5) judging whether the number of rows in the new performance parameter matrix is the sum of the first and second predetermined numbers, when the number of rows in the new performance parameter matrix is the sum of the first and second predetermined numbers, 6) outputting respective pre-coding matrixes corresponding to the new performance parameter matrix as pre-coding matrix codebook;

when the number of rows in the new performance parameter matrix is not the sum of the first and second predetermined numbers, setting the new performance parameter matrix as a current performance parameter matrix, and repeating the processing from 1).

5. The method for generating pre-coding matrix codebook according to claim 1, wherein the second predetermined number of pre-coding matrixes in the second format are selected from the universal set of pre-coding matrixes in the second format by:

setting the selected first predetermined number of pre-coding matrixes in the first format as a currently selected set of pre-coding matrixes, and setting the second universal set of pre-coding matrixes as a currently candidate set of pre-coding matrixes;

1) taking out one pre-coding matrix in the second format from the currently candidate set of pre-coding matrixes, as an added pre-coding matrix,
2) combining the taken out pre-coding matrix in the second format with the currently selected set of pre-coding matrixes, so as to form a combined set of pre-coding matrixes,
3) forming a performance parameter matrix according to the combined set of pre-coding matrixes and the set of channel matrixes, each row of the performance parameter matrix represents performance parameter values related to the same pre-coding matrix, and each column represents performance parameter values related to the same channel matrix,
4) calculating performance parameters values of the performance parameter matrix,
5) repeating processes 1) to 4) for M2 times, and each time taking out one different pre-coding matrix in the second format, so as to obtain M2 performance parameters values, where M2 is the number of pre-coding matrixes in the currently candidate set of pre-coding matrixes,
6) setting a combined set of pre-coding matrixes, which is corresponding to a performance parameter matrix that corresponds to a maximum one among the M2 performance parameters values, as a currently selected set of pre-coding matrixes,
7) judging whether the number of pre-coding matrixes in the currently selected set of pre-coding matrixes is the sum of the first and second predetermined numbers, when the number of pre-coding matrixes in the currently selected set of pre-coding matrixes is the sum of the first and second predetermined numbers, 8) outputting pre-coding matrixes in the currently selected set of pre-coding matrixes as pre-coding matrix codebook;

when the number of pre-coding matrixes in the currently selected set of pre-coding matrixes is not the sum of the first and second predetermined numbers, deleting an added pre-coding matrix corresponding to a maximum one of the M2 performance parameters values from the currently candidate set of pre-coding matrixes to obtain a new currently candidate set of pre-coding matrixes, and repeating the processing from 1) for the currently selected set of pre-coding matrixes and the new currently candidate set of pre-coding matrixes.

6. The method for generating pre-coding matrix codebook according to claim 3, wherein the second predetermined number of pre-coding matrixes in the second format making the maximum contribution are selected by:

selecting rows from the performance parameter matrix corresponding to the selected first predetermined number of pre-coding matrixes in the first format, as a selected performance parameter matrix, where assuming the number of selected rows is K; and selecting rows from the performance parameter matrix corresponding to the pre-coding matrixes in the second format, as an candidate performance parameter matrix, where assuming the number of selected rows is M2, 1) taking out a row from the candidate performance parameter matrix as a newly added row,
2) merging the newly added row with the selected performance parameter matrix, so as to form a matrix of K+1 rows and N columns;
3) calculating performance parameters values of the matrix of K+1 rows and N columns;
4) repeating steps 1) to 3) for M2 times, and each time taking out one row corresponding to a different pre-coding matrix in the second format from the candidate performance parameter matrix as a newly added row, so as to obtain M2 performance parameters values;
5) setting a matrix of K+1 rows and N columns corresponding to a maximum one of the M2 performance parameters values as a new selected performance parameter matrix,
6) judging whether the number of rows in the new selected performance parameter matrix is the sum of the first and second predetermined numbers, when the number of rows in the new selected performance parameter matrix is the sum of the first and second predetermined numbers, 7) outputting respective pre-coding matrixes corresponding to respective rows in the new selected performance parameter matrix as pre-coding matrix codebook;

when the number of rows is not the sum of the first and second predetermined numbers, deleting an added row corresponding to the maximum one of the M2 performance parameters values from the candidate performance parameter matrix, so as to form a new candidate performance parameter matrix, and repeating the processing from 1) for the new selected performance parameter matrix and the new performance parameter matrix.

7. An apparatus for generating pre-coding matrix codebook, comprising:

a universal set of first pre-coding matrixes acquiring unit configured to acquire a universal set of pre-coding matrixes in a first format;

a universal set of second pre-coding matrixes acquiring unit configured to acquire a universal set of pre-coding matrixes in a second format;

a first pre-coding matrix selecting unit configured to select a first predetermined number of pre-coding matrixes in the first format from the universal set of pre-coding matrixes in the first format; and a second pre-coding matrix selecting unit configured to select a second predetermined number of pre-coding matrixes in the second format from the universal set of pre-coding matrixes in the second format, according to the selected first predetermined number of pre-coding matrixes in the first format;

wherein the second pre-coding matrix selecting unit comprises:

a combined set of pre-coding matrixes generating sub-unit configured to merge the selected first predetermined number of pre-coding matrixes in the first format with the universal set of pre-coding matrixes in the second format, so as to form a combined set of pre-coding matrixes;

a channel matrixes set acquiring sub-unit configured to form a set of channel matrixes of a communication system to which the pre-coding matrixes are applied, and each of the channel matrixes is corresponding to one channel example;

a performance parameter matrix generating sub-unit configured to form a performance parameter matrix according to the combined set of pre-coding matrixes and the set of channel matrixes, each row of the performance parameter matrix represents performance parameter values related to the same pre-coding matrix, and each column represents performance parameter values related to the same channel matrix; and a pre-coding matrixes in second format selecting sub-unit configured to select the second predetermined number of pre-coding matrixes in the second format making a maximum contribution to the performance of the communication system, by using the performance parameter matrix and according to contributions to the performance of the communication system made by the respective pre-coding matrixes in the second format, wherein the universal set of first pre-coding matrixes acquiring unit, the universal set of second pre-coding matrixes acquiring unit, the first pre-coding matrix selecting unit, and the second pre-coding matrix selecting unit comprise hardware.

8. The apparatus for generating pre-coding matrix codebook according to claim 7, wherein the pre-coding matrixes in second format selecting sub-unit selects the second predetermined number of pre-coding matrixes in the second format making the maximum contribution by stepwise decreasing rows in the performance parameter matrix corresponding to pre-coding matrixes in the second format making a minimum contribution to the performance of the communication system, or selects the second predetermined number of pre-coding matrixes in the second format making the maximum contribution by stepwise increasing rows corresponding to pre-coding matrixes in the second format making the maximum contribution to the performance of the communication system, based on rows in the performance parameter matrix corresponding to the first predetermined number of pre-coding matrixes in the first format.

* * * * *